US012621700B2

(12) United States Patent
Zhang et al.

(10) Patent No.: US 12,621,700 B2
(45) Date of Patent: May 5, 2026

(54) METHOD FOR REPORTING QOE MEASUREMENT REPORT, DEVICE, APPARATUS, AND STORAGE MEDIUM

(71) Applicant: DATANG MOBILE COMMUNICATIONS EQUIPMENT CO., LTD., Beijing (CN)

(72) Inventors: Mingzhu Zhang, Beijing (CN); Chunlin Ni, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 308 days.

(21) Appl. No.: 18/557,582

(22) PCT Filed: Apr. 29, 2022

(86) PCT No.: PCT/CN2022/090668
§ 371 (c)(1),
(2) Date: Oct. 26, 2023

(87) PCT Pub. No.: WO2022/237602
PCT Pub. Date: Nov. 17, 2022

(65) Prior Publication Data
US 2024/0224102 A1 Jul. 4, 2024

(30) Foreign Application Priority Data
May 8, 2021 (CN) .......................... 202110502074.5

(51) Int. Cl.
*H04W 24/10* (2009.01)
*H04L 41/5067* (2022.01)
(52) U.S. Cl.
CPC ......... *H04W 24/10* (2013.01); *H04L 41/5067* (2013.01)

(58) Field of Classification Search
None
See application file for complete search history.

(56) References Cited

U.S. PATENT DOCUMENTS

2010/0029266 A1 2/2010 Van Gassel et al.
2011/0202593 A1 8/2011 Vaderna et al.
(Continued)

FOREIGN PATENT DOCUMENTS

BE 1021061 B1 3/2015
CN 102124717 A 7/2011
(Continued)

OTHER PUBLICATIONS

State Intellectual Property Office of the People's Republic of China, Office Action Issued in Application No. 202110502074.5, Sep. 20, 2024, 6 pages.
(Continued)

*Primary Examiner* — Walter J Divito
(74) *Attorney, Agent, or Firm* — KILPATRICK TOWNSEND & STOCKTON LLP

(57) ABSTRACT

Provided in embodiments of the present disclosure are a method for reporting a QoE measurement report, a device, an apparatus, and a storage medium. The method is applied in a user terminal and includes receiving first indication information for a QoE measurement report sent by a network side device; and reporting the QoE measurement report and/or information related to the QoE measurement report to the network side device according to the first indication information. By means of the method for reporting a QoE measurement report, the device, and apparatus, and the storage medium provided in embodiments of the present disclosure, a multitude of user terminals reporting a multitude of QoE measurement reports and causing a new wave of network side device congestion can be prevented (Continued)

Receiving first indication information of one or more QoE measurement reports transmitted from a network side device ⌐100

Reporting a QoE measurement report and/or information associated with the QoE measurement report to the network side device based on the first indication information ⌐101 when a network side device restores reporting of QoE measurement reports by user terminals.

16 Claims, 2 Drawing Sheets

(56) References Cited

U.S. PATENT DOCUMENTS

| | | | | |
|---|---|---|---|---|
| 2024/0196248 A1* | 6/2024 | Jeong | .................... | H04W 24/10 |
| 2024/0196286 A1* | 6/2024 | Van Der Velde | ... | H04L 41/5067 |

FOREIGN PATENT DOCUMENTS

| | | | | |
|---|---|---|---|---|
| CN | 102523291 A | 6/2012 | | |
| CN | 103107958 A | 5/2013 | | |
| CN | 109416822 A | 3/2019 | | |
| CN | 110870258 A | 3/2020 | | |
| CN | 112512059 A | 3/2021 | | |
| EP | 2779718 A1 * | 9/2014 | ............ | H04W 24/08 |
| WO | 2014015696 A1 | 1/2014 | | |
| WO | 2021046812 A1 | 3/2021 | | |
| WO | 2021064254 A1 | 4/2021 | | |

OTHER PUBLICATIONS

European Patent Office, Extended European Search Report Issued in Application No. 22806570.2, Oct. 22, 2024, Germany, 15 pages.
Nokia et al., "QoE reporting control by RAN awareness on QoE parameter", 3GPP TSG-RAN WG2 Meeting #113bis Electronic, Online, Apr. 12-Apr. 20, 2021, total 4 pages, R2-2103556.
CMCC, "Start and stop for NR QoE measurement", 3GPP TSG-RAN WG2 Meeting #113 bis electronic, Online, Apr. 12-Apr. 20, 2021, total 5 pages, R2-2103693.
Huawei et al., "Report of offline discussion: [AT113bis-e][037][eQoE] Pause Resume", 3GPP TSG-RAN WG2 Meeting #113bis Electronic, Online, Apr. 12-20, 2021, total 10 pages, R2-2104627.
3GPP TS 38.331 V16.4.1,3rd Generation Partnership Project; Technical Specification Group Radio Access Network; NR;Radio Resource Control (RRC) protocol specification (Release 16) total 949 pages, Mar. 2021.
3GPP TS 37.320 V16.4.0, 3rd Generation Partnership Project;Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16), total 35 pages, Mar. 2021.
ISA State Intellectual Property Office of the People's Republic of China, International Search Report Issued in Application No. PCT/CN2022/090668, Aug. 3, 2022, WIPO, 4 pages.
Search Report of Corresponding CN Patent Application No. 202110502074.5 DATED Sep. 14, 2024.
Search Report of Corresponding CN Patent Application No. 202110502074.5 DATED Feb. 19, 2025.
Search Report of Corresponding CN Patent Application No. 202110502074.5 DATED May 12, 2025.
Ericsson, "pCR for TR 38.890: Handling of QoE Measurement and Reporting and Support for New Services," 3GPP TSG-RAN WG3 Meeting #111-e, R3-210527, Online, Jan. 25-Feb. 4, 2021, Agenda Item: 15.2.
ZTE Corporation, Sanechips, "Discussion on pause/resume NR QoE reporting," 3GPP TSG-RAN WG2 Meeting #113-bis-e, R2-2104271, Electronic meeting, Apr. 12-Apr. 20, 2021, Agenda Item: 8.14.2.2.
Huawei—Moderator, "Summary of Offline Discussion on RAN Configuration and Reporting of QoE Measurement," 3GPP TSG-RAN WG3 Meeting #111-e, R3-21xxxx, Online, Jan. 25-Feb. 4, 2021, Agenda Item: 15.2.

* cited by examiner

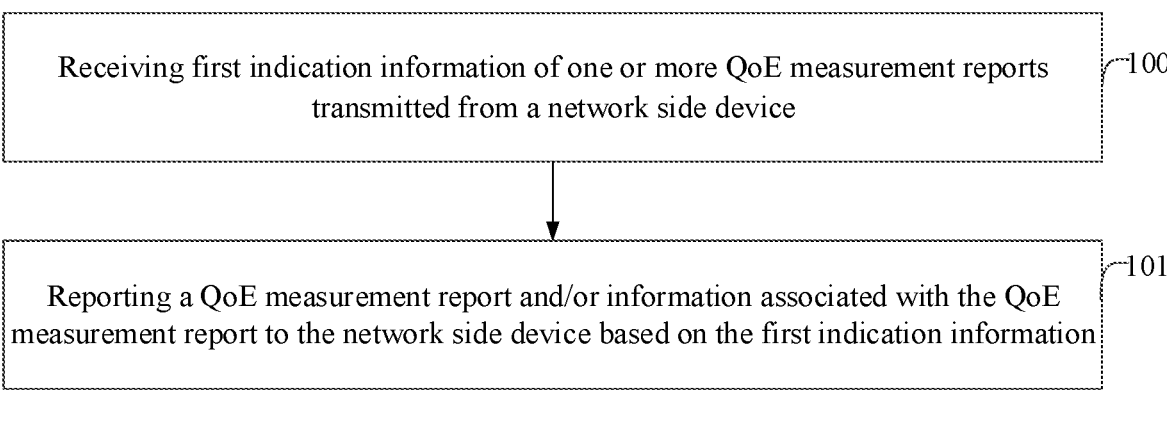

Receiving first indication information of one or more QoE measurement reports transmitted from a network side device ⌐100

Reporting a QoE measurement report and/or information associated with the QoE measurement report to the network side device based on the first indication information ⌐101

FIG. 1

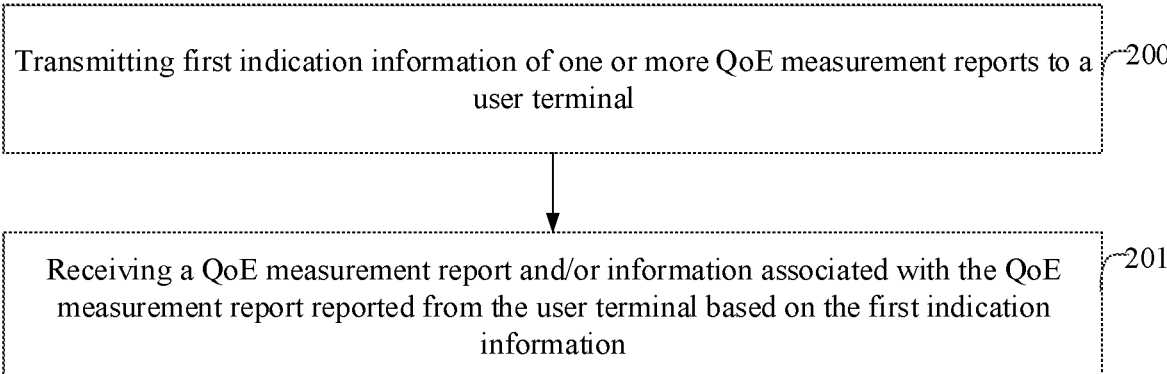

Transmitting first indication information of one or more QoE measurement reports to a user terminal ⌐200

Receiving a QoE measurement report and/or information associated with the QoE measurement report reported from the user terminal based on the first indication information ⌐201

FIG. 2

User terminal

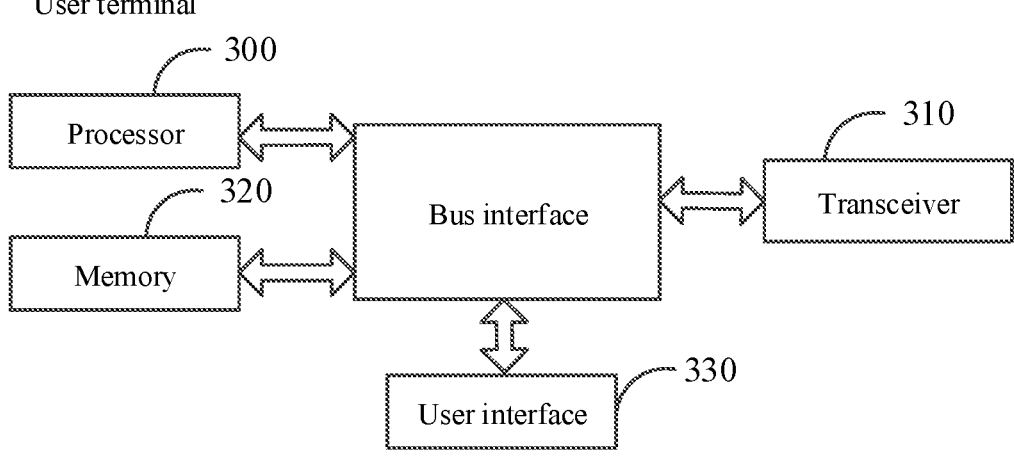

Processor — 300

Memory — 320

Bus interface

Transceiver — 310

User interface — 330

FIG. 3

Network side device

METHOD FOR REPORTING QOE MEASUREMENT REPORT, DEVICE, APPARATUS, AND STORAGE MEDIUM

CROSS-REFERENCE TO RELATED APPLICATION

The present application is a National Stage of International Application No. PCT/CN2022/090668, filed on Apr. 29, 2022, which claims priority to Chinese patent application No. 2021105020745 filed on May 8, 2021, entitled "Method for Reporting QoE Measurement Report, Device, Apparatus, and Storage Medium", which are hereby incorporated by reference in their entireties.

FIELD

The present application relates to the field of communication, and in particular, to methods and apparatuses for reporting quality of experience (QoE) measurement reports, devices and a storage medium.

BACKGROUND

In a universal mobile telecommunications system (UMTS) terrestrial radio access network (UTRAN) and an evolved UMTS terrestrial radio access network (E-UTRAN), quality of experience (QoE) measurement collection is specified for streaming services. For new radio (NR) QoE measurements, not only the experience parameters of streaming media services need to be collected, typical performance requirements of different services (such as augmented reality (AR)/virtual reality (VR) and ultra reliable low latency communication (URLLC)) are also considered.

The NR QoE measurements aim to collect experience parameters of different service types. When a core network (CN) or an operation, management and maintenance (OAM) transmits QoE configuration to a network side device, the network side device will forward the QoE configuration to a user equipment (UE), the UE collects relevant QoE measurements and reports QoE measurement reports to the network side device, and the network side device forwards the QoE measurement reports to the core network or OAM. The QoE measurement reports are generally very large. In case that burdens of the network side device are heavy, or the UE is handed over or reconnected to a network side device that does not support the QoE function, the network side device needs to control the reporting for the QoE measurement reports from the UE, to reduce burdens or ensure validities of the QoE measurement reports. When the burdens are alleviated, the network side device resumes reporting for the QoE measurement reports from the UE. A large number of UEs will report a large number of QoE measurement reports, which may easily cause a new round of network side congestion.

SUMMARY

Embodiments of the present application provide methods and apparatuses for reporting quality of experience (QoE) measurement reports, devices and a storage medium.

An embodiment of the present application provides a method for reporting quality of experience (QoE) measurement reports, applied to a user terminal, including:

receiving first indication information of one or more QoE measurement reports transmitted from a network side device: and reporting a QoE measurement report and/or information associated with the QoE measurement report to the network side device based on the first indication information.

In an embodiment, the first indication information is used to indicate reporting for the QoE measurement report, and the first indication information includes one or more of the following:

a timer for reporting the QoE measurement report after expiration;

a limited size of a reported QoE measurement report;

a service type corresponding to a reported QoE measurement report;

a priority of the service type corresponding to a reported QoE measurement report;

a QoE measurement identifier (ID) of a reported QoE measurement report;

a priority of the QoE measurement ID of a reported QoE measurement report;

a configuration type corresponding to the reported QoE measurement report; and timing backoff time for reporting the QoE measurement report.

In an embodiment, the reporting the QoE measurement report and/or the information associated with the QoE measurement report to the network side device includes:

reporting, to the network side device, a QoE measurement report stored after reporting for the QoE measurement report is paused and/or information associated with the QoE measurement report stored after reporting for the QoE measurement report is paused.

In an embodiment, the method is applied to a scenario where reporting for the QoE measurement report is resumed after being paused.

In an embodiment, the reporting the QoE measurement report and the information associated with the QoE measurement report to the network side device based on the first indication information includes:

reporting the QoE measurement report to the network side device based on the first indication information, and further reporting information of a remaining QoE measurement report to the network side device, where the information of the remaining QoE measurement report includes one or more of the following information:

a size of the remaining QoE measurement report;

storage time of the remaining QoE measurement report;

a service type corresponding to the remaining QoE measurement report and/or a QoE measurement ID of the remaining QoE measurement report;

a size of a QoE measurement report corresponding to the service type corresponding to the remaining QoE measurement report and/or a size of a QoE measurement report corresponding to the QoE measurement ID of the remaining QoE measurement report;

a configuration type corresponding to the remaining QoE measurement report;

a size of a QoE measurement report corresponding to the configuration type corresponding to the remaining QoE measurement report; and a first ID used to indicate whether the QoE measurement report has been reported.

In an embodiment, the first indication information is used to request to obtain the information associated with the QoE measurement report, and the first indication information includes one or more of the following:

a request for reporting a size of a stored QoE measurement report;

a request for reporting storage time of a stored QoE measurement report;

a request for reporting a service type corresponding to the stored QoE measurement report and/or a QoE measurement identifier (ID) of a stored QoE measurement report;

a request for reporting a size of a QoE measurement report corresponding to the service type corresponding to the stored QoE measurement report and/or a size of a QoE measurement report corresponding to the QoE measurement ID of the stored QoE measurement report;

a request for reporting a configuration type corresponding to the stored QoE measurement report; and a request for reporting a size of a QoE measurement report corresponding to the configuration type corresponding to the stored QoE measurement report.

In an embodiment, the information associated with the QoE measurement report includes one or more of the following:

a size of a stored QoE measurement report;

storage time of a stored QoE measurement report;

a service type corresponding to a stored QoE measurement report and/or a QoE measurement identifier (ID) of a stored QoE measurement report;

a size of a QoE measurement report corresponding to the service type corresponding to the stored QoE measurement report and/or a size of a QoE measurement report corresponding to the QoE measurement ID of the stored QoE measurement report;

a configuration type corresponding to a stored QoE measurement report;

a size of a QoE measurement report corresponding to the configuration type corresponding to the stored QoE measurement report; and a first ID used to indicate whether the QoE measurement report has been reported.

In an embodiment, the first indication information is a second identifier indicating that the user terminal resumes reporting for the QoE measurement report.

In an embodiment, the method further includes:

receiving second indication information transmitted from the network side device, where the second indication information is used to indicate the user terminal to report all QoE measurement reports;

or, receiving third indication information transmitted from the network side device, where the third indication information is used to indicate the user terminal to report a QoE measurement report, where the third indication information includes one or more of the following:

a timer for reporting the QoE measurement report after expiration;

a limited size of a reported QoE measurement report;

a service type corresponding to a reported QoE measurement report;

a priority of the service type corresponding to the reported QoE measurement report;

a QoE measurement ID of a reported QoE measurement report;

a priority of the QoE measurement ID of the reported QoE measurement report;

a configuration type corresponding to a reported QoE measurement report; and timing backoff time for reporting the QoE measurement report.

In an embodiment, the first indication information is time indication information used to indicate the user terminal to report the QoE measurement report.

In an embodiment, the time indication information is determined based on a terminal ID of the user terminal.

An embodiment of the present application further provides a method for reporting quality of experience (QoE) measurement reports, applied to a network side device, including:

transmitting first indication information of one or more QoE measurement reports to a user terminal; and receiving a QoE measurement report and/or information associated with the QoE measurement report reported from the user terminal based on the first indication information.

In an embodiment, the receiving the QoE measurement report and/or the information associated with the QoE measurement report reported from the user terminal based on the first indication information includes:

receiving a QoE measurement report stored after reporting for the QoE measurement report is paused and/or information associated with the QoE measurement report stored after reporting for the QoE measurement report is paused reported from the user terminal.

In an embodiment, the method is applied to a scenario where reporting for the QoE measurement report is resumed after being paused.

In an embodiment, the receiving the QoE measurement report and the information associated with the QoE measurement report reported from the user terminal based on the first indication information includes:

receiving the QoE measurement report reported from the user terminal based on the first indication information, and further receiving information of a remaining QoE measurement report reported from the user terminal, where the information of the remaining QoE measurement report includes one or more of the following information:

a size of the remaining QoE measurement report;

storage time of the remaining QoE measurement report;

a service type corresponding to the remaining QoE measurement report and/or a QoE measurement identifier (ID) of the remaining QoE measurement report;

a size of a QoE measurement report corresponding to the service type corresponding to the remaining QoE measurement report and/or a size of a QoE measurement report corresponding to the QoE measurement ID of the remaining QoE measurement report;

a configuration type corresponding to the remaining QoE measurement report;

a size of a QoE measurement report corresponding to the configuration type corresponding to the remaining QoE measurement report; and a first ID used to indicate whether the QoE measurement report has been reported.

In an embodiment, the transmitting the first indication information of one or more QoE measurement reports to the user terminal includes:

transmitting, to the user terminal, the first indication information for requesting to obtain the information associated with the QoE measurement report, where the first indication information includes one or more of the following:

a request for reporting a size of a stored QoE measurement report;

a request for reporting storage time of a stored QoE measurement report;

a request for reporting a service type corresponding to the stored QoE measurement report and/or a QoE measurement identifier (ID) of a stored QoE measurement report;

a request for reporting a size of a QoE measurement report corresponding to the service type corresponding to the stored QoE measurement report and/or a size of a QoE measurement report corresponding to the QoE measurement ID of the stored QoE measurement report;

a request for reporting a configuration type corresponding to the stored QoE measurement report; and a request for reporting a size of a QoE measurement report corresponding to the configuration type corresponding to the stored QoE measurement report.

In an embodiment, the method further includes:

transmitting second indication information to the user terminal, where the second indication information is used to indicate the user terminal to report all QoE measurement reports;

or, transmitting third indication information to the user terminal, where the third indication information is used to indicate the user terminal to report a QoE measurement report, where the third indication information includes one or more of the following:

a timer for reporting the QoE measurement report after expiration;

a limited size of a reported QoE measurement report;

a service type corresponding to a reported QoE measurement report;

a priority of the service type corresponding to the reported QoE measurement report;

a QoE measurement ID of a reported QoE measurement report;

a priority of the QoE measurement ID of the reported QoE measurement report;

a configuration type corresponding to a reported QoE measurement report; and timing backoff time for reporting the QoE measurement report.

An embodiment of the present application further provides a user terminal, including a memory, a transceiver and a processor, where the memory is used to store a computer program;

the transceiver is used to transmit and receive data under control of the processor; and the processor is used to read the computer program in the memory and perform steps of the above-mentioned method for reporting quality of experience (QoE) measurement reports.

An embodiment of the present application further provides a network side device, including a memory, a transceiver and a processor, where the memory is used to store a computer program:

the transceiver is used to transmit and receive data under control of the processor; and the processor is used to read the computer program in the memory and perform steps of the above-mentioned method for reporting quality of experience (QoE) measurement reports.

An embodiment of the present application further provides an apparatus reporting quality of experience (QoE) measurement reports, applied to a user terminal, including:

a first receiving device, used for receiving first indication information of one or more QoE measurement reports transmitted from a network side device: and a reporting device, used for reporting a QoE measurement report and/or information associated with the QoE measurement report to the network side device based on the first indication information.

An embodiment of the present application further provides an apparatus reporting quality of experience (QoE) measurement reports, applied to a network side device, including:

a transmitting device, used for transmitting first indication information of one or more QoE measurement reports to a user terminal; and a second receiving device, used for receiving a QoE measurement report and/or information associated with the QoE measurement report reported from the user terminal based on the first indication information.

An embodiment of the present application further provides a processor-readable storage medium storing a computer program that causes, when executed by a processor, the processor to perform steps of the method for reporting quality of experience (QoE) measurement reports applied to the user terminal and the method for reporting quality of experience (QoE) measurement reports applied to the network side device.

In the methods and apparatuses for reporting QoE measurement reports, the devices, and the storage medium provided by the embodiments of the present application, the user terminal can report the QoE measurement report and/or the information associated with the QoE measurement report based on the first indication information transmitted from the network side device, to avoid a new round of network side congestion caused by a large number of user terminals reporting a large number of QoE measurement reports when the network side device resumes reporting for the QoE measurement reports from the user terminal.

BRIEF DESCRIPTION OF THE DRAWINGS

In order to illustrate the solutions of the embodiments based on the present application, the accompanying drawings used in the description of the embodiments are briefly introduced below. It should be noted that the drawings in the following description are only some embodiments of the present application.

FIG. 1 is a first schematic flowchart of a method for reporting quality of experience (QoE) measurement reports according to an embodiment of the present application;

FIG. 2 is a second schematic flowchart of a method for reporting quality of experience (QoE) measurement reports according to an embodiment of the present application;

FIG. 3 is a schematic structural diagram of a user terminal according to an embodiment of the present application;

DETAILED DESCRIPTION

Figure 4:
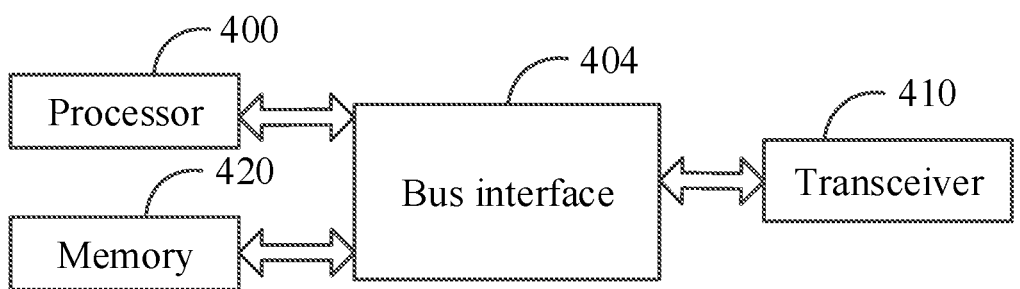
FIG. 4 is a schematic structural diagram of a network side device according to an embodiment of the present application.

In the embodiments of the present application, the term "and/or" describes a related relationship of associated objects, and indicates that there can be three kinds of relationships. For example, A and/or B can represent that A exists alone, A and B exist simultaneously, and B exists alone. Character "/" generally indicates that the associated objects have an "or" relationship.

In the embodiments of the present application, the term "multiple" refers to two or more, and other quantifiers are similar.

The solutions in the embodiments of the present application are clearly and completely described in the following with reference to the accompanying drawings in the embodiments of the present application. These embodiments are only a part of the embodiments of the present application, and not all of the embodiments.

The 3rd generation partnership project (3GPP) specification defines two quality of experience (QoE) configuration types, one type is signaling-based case, that is, a signaling-based QoE configuration type, and the process includes that an operation, management and maintenance (OAM) transmits QoE configuration to a core network (CN), the CN transmits the QoE configuration to a network side device, and the network side device forwards the QoE configuration to a user equipment (UE). The configuration in this case is for a specific UE. The other type is a management-based case, that is, a management-based QoE configuration type, the process includes that that the OAM directly transmits the QoE configuration to the network side device, and the network side device forwards the configuration to the UE. The configuration in this case is for a specific UE or multiple UEs.

The QoE measurement management parameters are specified in the R16 protocol version, and are shown in the following.

a. QoE Collection Entity Address

This is a parameter which defines an internet protocol (IP) address to which the QoE measurement collection (QMC) records shall be transferred. internet protocol version 4 (Ipv4) or internet protocol version 6 (Ipv6) addresses may be used.

b. QoE Reference

This parameter defines a network request session. The QoE reference shall be globally unique, and it is composed as follows:

mobile country code (MCC)+mobile network code (MNC)+QMC identifier (ID), where the MCC and the MNC, together with a trace activation request, come from a management system, and are used for identifying a public land mobile network (PLMN) included in the management system, and the QMC ID is a 3-byte string.

c. PLMN Target

This parameter defines the PLMN for which sessions shall be selected in the network request session in case of area based QMC when several PLMNs are supported in a radio access network (RAN). (This means that shared cells and unshared cells are allowed for the specified PLMN. Furthermore, several PLMNs can be used for unshared RAN cases as well as for shared RAN cases.) Only the sessions may be selected in case that the PLMN that the UE reports as selected PLMN is the same as the PLMN target. The PLMN target may differ from the PLMN specified in the network request session ID, as that specifies the PLMN containing the management system requesting the network request session from a network equipment (NE). The parameter is mandatory if network sharing is deployed.

d. Area Scope

This parameter defines a physical area or cells or tracking area or location area where the QoE measurements shall be performed. If the parameter does not exist, the QMC shall be performed throughout the PLMN specified in PLMN target.

e. QMC Configuration File f. QMC Target g. Recording Session ID

This parameter shall be the same for the whole session in an application layer, while for each different session in the application layer, the recording session ID shall be different.

After the core network or OAM transmits the QoE configuration to the network side device, the network side device will forward the QoE configuration to the UE, and the UE collects relevant QoE measurements and reports them to the network side device. Since the QoE measurement report are generally very large, and in case that burdens of the network side device are heavy, or the UE is handed over or reconnected to a network side device that does not support the QoE function, the network side device needs to control the reporting for the QoE measurement report from the UE to alleviate burdens or to ensure the validity of the QoE measurement reports. When the burdens are alleviated, the network side device resumes reporting for the QoE measurement report from the UE. A large number of UEs will report a large number of QoE measurement reports, which may easily cause a new round of network side congestion.

In response to the above problems, various embodiments of the present application provide a solution that can avoid a new round of congestion caused by the network side device resuming the reporting for the QoE measurement reports.

FIG. 1 is a first schematic flowchart of a method for reporting quality of experience (QoE) measurement reports according to an embodiment of the present application. The method is applied to a user terminal. As shown in FIG. 1, the method includes the following steps.

Step 100: receiving first indication information of one or more QoE measurement reports transmitted from a network side device.

The first indication information is used to indicate the user terminal to report a QoE measurement report and/or information associated with the QoE measurement report.

Step 101: reporting a QoE measurement report and/or information associated with the QoE measurement report to the network side device based on the first indication information.

When the network side device resumes reporting for the QoE measurement report from the user terminal, in order to avoid a new round of network side congestion caused by a large number of user terminals reporting a large number of QoE measurement reports, in the embodiment of the present application, the network side device (for example, a next generation NodeB (gNB) of a base station) can transmit the first indication information to the user terminal. After receiving the first indication information, the user terminal can report the QoE measurement report and/or the information associated with the QoE measurement report based on an indication in the first indication information. Details about how the user terminal reports the QoE measurement report and/or the information associated with the QoE measurement report based on the indications in the first indication information, and specific content of the information associated with the QoE measurement report will be described below:

In an embodiment, the above-mentioned first indication information may be included in various dedicated signaling or broadcast messages, and is not specifically limited here.

In the method for reporting QoE measurement reports provided by the embodiments of the present application, the user terminal can report the QoE measurement report and/or the information associated with the QoE measurement report based on the first indication information transmitted from the network side device, to avoid a new round of network side congestion caused by a large number of user terminals reporting a large number of QoE measurement reports when the network side device resumes reporting for the QoE measurement reports from the user terminal.

In an embodiment, the first indication information is used to indicate reporting for a QoE measurement report. The first indication information may include one or more of the following.

(1) A QoE Measurement Identifier (ID) of a Reported QoE Measurement Report.

The network side device may transmit the first indication information to the user terminal, where the first indication information includes the QoE measurement ID of the reported QoE measurement report, that is, the network side device indicates to resume reporting for the QoE measurement report corresponding to which QoE measurement ID. After receiving the first indication information, the user terminal can determine to report the QoE measurement report corresponding to which QoE measurement ID based on the first indication information, and then select the QoE measurement report corresponding to the determined QoE measurement ID for reporting. The first indication information may indicate one or more QoE measurement IDs.

In an embodiment, the above QoE measurement ID may be the QoE reference.

It should be noted that QoE measurement IDs corresponding to each QoE configuration may be carried by the network side device in a QoE measurement configuration message and transmitted to the user terminal, and the user terminal can determine the QoE measurement report corresponding to the QoE configuration based on the QoE measurement ID.

(2) A Timer for Reporting the QoE Measurement Report after Expiration.

The network side device may transmit the first indication information to the user terminal, where the first indication information includes the timer for reporting the QoE measurement report after expiration. For example, the timer is set to 30 milliseconds, that is, the user terminal is indicated to report the QoE measurement report after the timer expires in 30 milliseconds. After receiving the first indication information, the user terminal can determine a duration after which to report the QoE measurement report based on the timer in the first indication information.

(3) A Limited Size of the Reported QoE Measurement Report.

The network side device may transmit the first indication information to the user terminal, where the first indication information includes the limited size of the reported QoE measurement report. For example, a total size of the QoE measurement reports that can be reported from the user terminal may be limited, or a size of a QoE measurement report corresponding to the service type corresponding to the reported QoE measurement report and a size of a QoE measurement report corresponding to the QoE measurement ID of the reported QoE measurement report may be limited, or a size of a QoE measurement report corresponding to the configuration type corresponding to the reported QoE measurement report may be limited. After receiving the first indication information, the user terminal can determine the size of the QoE measurement report that can be reported based on the first indication information, and select a QoE measurement report having an appropriate size for reporting.

(4) A Service Type Corresponding to the Reported QoE Measurement Report.

The network side device may transmit the first indication information to the user terminal, where the first indication information includes the service type corresponding to the reported QoE measurement report, that is, the network side device indicates to resume reporting for the QoE measurement report corresponding to which service type. After receiving the first indication information, the user terminal can determine to report the QoE measurement report corresponding to which service type based on the first indication information, and select the QoE measurement report corresponding to the service type for reporting. The first indication information may indicate one or more service types.

(5) A Priority of the Service Type Corresponding to the Reported QoE Measurement Report.

The network side device may transmit the first indication information to the user terminal, where the first indication information includes the priority of the service type corresponding to the reported QoE measurement report, that is, the network side device indicates to resume reporting for the QoE measurement report corresponding to which priority of the service type. After receiving the first indication information, the user terminal can determine to report the QoE measurement report corresponding to which priority of the service type based on the first indication information, and select the corresponding QoE measurement report for reporting. Priorities of each service type can be pre-configured to the user terminal by OAM or CN or network side device, or can be transmitted to the user terminal by dedicated signaling or broadcast messages.

(6) A Priority of the QoE Measurement ID of the Reported QoE Measurement Report.

The network side device may transmit the first indication information to the user terminal, where the first indication information includes the priority of the QoE measurement ID of the reported QoE measurement report, that is, the network side device indicates to resume reporting for the QoE measurement report of which priority of the QoE measurement ID. After receiving the first indication information, the user terminal can determine to report the QoE measurement report of which priority of the QoE measurement ID based on the first indication information, and select the corresponding QoE measurement report for reporting. Priorities of each QoE measurement ID can be pre-configured to the user terminal by OAM or CN or network side device, or can be transmitted to the user terminal by dedicated signaling or broadcast messages.

(7) A Configuration Type Corresponding to the Reported QoE Measurement Report.

The network side device may transmit the first indication information to the user terminal, where the first indication information includes the configuration type corresponding to the reported QoE measurement report, that is, the network side device indicates to resume reporting for the QoE measurement report corresponding to which configuration type. For example, the network side device may indicate to resume the QoE measurement report corresponding to a signaling-based QoE configuration type, or the network side device may indicate to resume the QoE measurement report corresponding to a management-based QoE configuration type. After receiving the first indication information, the user terminal may determine to report the QoE measurement report corresponding to which configuration type, and select the corresponding QoE measurement report for reporting.

(8) Timing Backoff Time for Reporting the QoE Measurement Report.

The network side device may transmit the first indication information to the user terminal, where the first indication information includes the timing backoff time for reporting the QoE measurement report, that is, the network side device indicates the user terminal how long to wait after the timer expires (i.e. the timing backoff time) before reporting the QoE measurement report. For example, if the timer is set to 30 milliseconds and the timing backoff time is set to 10 milliseconds, the user terminal is indicated to wait 10 milliseconds after the 30 millisecond timer expires to report the QoE measurement report. After receiving the first indication information, the user terminal can determine the duration after which to report the QoE measurement report based on the timing backoff time in the first indication information. The timer may be pre-configured from the network side device to the user terminal, or may be transmitted from the network side device to the user terminal by dedicated signaling or broadcast messages.

In the method for reporting QoE measurement reports provided by the embodiments of the present application, the user terminal can report the QoE measurement report based on the first indication information transmitted from the network side device, to avoid a new round of network side congestion caused by a large number of user terminals reporting a large number of QoE measurement reports when the network side device resumes reporting for the QoE measurement reports from the user terminal.

In an embodiment, the reporting the QoE measurement report and/or the information associated with the QoE measurement report to the network side device includes:

reporting, to the network side device, a QoE measurement report stored after reporting for the QoE measurement report is paused and/or information associated with the QoE measurement report stored after reporting for the QoE measurement report is paused.

In various embodiments of the present application, the QoE measurement report and/or the information associated with the QoE measurement report reported from the user terminal to the network side device may refer to the QoE measurement report stored by the user terminal after reporting for the QoE measurement report is paused and/or information associated with the QoE measurement report stored by the user terminal after reporting for the QoE measurement report is paused.

In an embodiment, the methods provided by various embodiments of the present application can be applied to a scenario where reporting for the QoE measurement report is resumed after being paused.

In an embodiment, the reporting the QoE measurement report and the information associated with the QoE measurement report to the network side device based on the first indication information includes:

reporting the QoE measurement report to the network side device based on the first indication information, and further reporting information of a remaining QoE measurement report to the network side device, where the information of the remaining QoE measurement report includes one or more of the following information:

a size of the remaining QoE measurement report;

storage time of the remaining QoE measurement report;

a service type corresponding to the remaining QoE measurement report and/or a QoE measurement ID of the remaining QoE measurement report;

a size of a QoE measurement report corresponding to the service type corresponding to the remaining QoE measurement report and/or a size of a QoE measurement report corresponding to the QoE measurement ID of the remaining QoE measurement report;

a configuration type corresponding to the remaining QoE measurement report;

a size of a QoE measurement report corresponding to the configuration type corresponding to the remaining QoE measurement report; and a first ID used to indicate whether the QoE measurement report has been reported.

In an embodiment of the present application, when the user terminal reports the QoE measurement report based on the first indication information, it may also report one or more of the following to the network side device: the size of the remaining QoE measurement report, the storage time of the remaining QoE measurement report, the service type corresponding to the remaining QoE measurement report, the QoE measurement ID of the remaining QoE measurement report, the configuration type corresponding to the remaining QoE measurement report, the size of the QoE measurement report corresponding to the service type corresponding to the remaining QoE measurement report, the size of the QoE measurement report corresponding to the QoE measurement ID of the remaining QoE measurement report, the size of the QoE measurement report corresponding to the configuration type corresponding to the remaining QoE measurement report, and the first ID used to indicate whether the QoE measurement report has been reported. After receiving the information, the network side device can determine how to control the user terminal to report the QoE measurement report in the future.

In the method for reporting QoE measurement reports provided by the embodiments of the present application, the user terminal can further report the information of the remaining QoE measurement report to the network side device when reporting the QoE measurement report, and the network side device can determine how to control the user terminal to report the QoE measurement report in the future.

In an embodiment, the first indication information is used to request to obtain the information associated with the QoE measurement report, and the first indication information includes one or more of the following:

a request for reporting a size of a stored QoE measurement report;

a request for reporting storage time of the stored QoE measurement report;

a request for reporting a service type corresponding to the stored QoE measurement report and/or a QoE measurement ID of the stored QoE measurement report;

a request for reporting a size of a QoE measurement report corresponding to the service type corresponding to the stored QoE measurement report and/or a size of a QoE measurement report corresponding to the QoE measurement ID of the stored QoE measurement report;

a request for reporting a configuration type corresponding to the stored QoE measurement report; and a request for reporting a size of a QoE measurement report corresponding to the configuration type corresponding to the stored QoE measurement report.

In the embodiment of the present application, the network side device may transmit first indication information to the user terminal. The first indication information is used to request to obtain the information associated with the QoE measurement report. For example, the user terminal may be requested to report the size of the stored QoE measurement report, the size of the QoE measurement report corresponding to the service type corresponding to the stored QoE measurement report and/or the size of the QoE measurement report corresponding to the QoE measurement ID of the stored QoE measurement report, the size of the QoE measurement report corresponding to the configuration type corresponding to the stored QoE measurement report, the storage time of the stored QoE measurement report, the service type corresponding to the stored QoE measurement report and/or the QoE measurement ID of the stored QoE measurement report, the configuration type corresponding to the stored QoE measurement report, etc. After receiving the first indication information, the user terminal can report the information associated with the QoE measurement report requested by the network side device based on the indications in the first indication information, the network side device can determine how to control the user terminal to report the QoE measurement reports in the future.

In the method for reporting QoE measurement reports provided by the embodiments of the present application, the user terminal can report the information associated with the QoE measurement report requested by the network side device based on the first indication information transmitted from the network side device, and the network side device can determine how to control the user terminal to report the QoE measurement report in the future, to avoid a new round of network side congestion caused by a large number of user terminals reporting a large number of QoE measurement reports.

In an embodiment, the information associated with the QoE measurement report includes one or more of the following:

the size of the stored QoE measurement report;
    the storage time of the stored QoE measurement report;
    the service type corresponding to the stored QoE measurement report and/or the QoE measurement ID of the stored QoE measurement report;
    a size of a QoE measurement report corresponding to the service type corresponding to the stored QoE measurement report and/or a size of a QoE measurement report corresponding to the QoE measurement ID of the stored QoE measurement report;
    the configuration type corresponding to the stored QoE measurement report;
    a size of a QoE measurement report corresponding to the configuration type corresponding to the stored QoE measurement report; and
    the first ID used to indicate whether the QoE measurement report has been reported.

In the embodiment of the present application, after receiving the first indication information (for example, the first indication information for requesting to obtain the information associated with the QoE measurement report) transmitted from the network side device, the user terminal may transmit various information associated with the QoE measurement report to the network side device based on the first indication information. For example, it may be one or more of the following information: the size of the QoE measurement report stored by the user terminal, the size of the QoE measurement report corresponding to the service type corresponding to the QoE measurement report stored by the user terminal, the size of the QoE measurement report corresponding to the QoE measurement ID of the QoE measurement report stored by the user terminal, the size of the QoE measurement report corresponding to the configuration type corresponding to the QoE measurement report stored by the user terminal, the storage time of the QoE measurement report stored by the user terminal, the service type corresponding to the QoE measurement report stored by the user terminal, the QoE measurement ID of the QoE measurement report stored by the user terminal, the configuration type corresponding to the QoE measurement report stored by the user terminal, and the first ID used to indicate whether the QoE measurement report has been reported. After receiving the information, the network side device can determine how to control the user terminal to report the QoE measurement report in the future.

In the method for reporting QoE measurement reports provided by the embodiments of the present application, the user terminal can report various information associated with the QoE measurement report to the network side device, the network side device can determine how to control the user terminal to report the QoE measurement report in the future, to avoid a new round of network side congestion caused by a large number of user terminals reporting a large number of QoE measurement reports.

In an embodiment, the first indication information is a second ID that indicates the user terminal to resume reporting a QoE measurement report.

In an embodiment of the present application, the network side device may transmit the first indication information to the user terminal, where the first indication information is a second ID that indicates the user terminal to resume reporting the QoE measurement report. After the user terminal receives the first indication information, it can independently determine how to report the QoE measurement report and/or the information associated with the QoE measurement report to the network side device, as well as specific content for reporting. For example, the user terminal may independently determine to report one or more QoE measurement reports to the network side device first, or may independently determine to report information associated with the stored QoE measurement report to the network side device, or may independently determine to prioritize reporting a QoE measurement report that has been stored for longer periods of time, or prioritize reporting a QoE measurement report corresponding to an immediate service type (such as VR), etc.

In an embodiment, the method further includes:

receiving second indication information transmitted from the network side device, where the second indication information is used to indicate the user terminal to report all QoE measurement reports;
    or,
    receiving third indication information transmitted from the network side device, where the third indication information is used to indicate the user terminal to report a QoE measurement report,
    where the third indication information includes one or more of the following:
    a timer for reporting the QoE measurement report after expiration;
    a limited size of the reported QoE measurement report;
    a service type corresponding to the reported QoE measurement report;
    a priority of the service type corresponding to the reported QoE measurement report;
    a QoE measurement ID of the reported QoE measurement report;

a priority of the QoE measurement ID of the reported QoE measurement report;

a configuration type corresponding to the reported QoE measurement report; and timing backoff time for reporting the QoE measurement report.

After the user terminal reports the information associated with the QoE measurement report stored by the user terminal or remaining QoE measurement report stored by the user terminal to the network side device based on the received first indication information, the network side device can determine how to control the user terminal to report the QoE measurement report in the future based on the information associated with these QoE measurement reports.

For example, if the network side device determines that the user terminal reporting for the QoE measurement report will not cause network congestion, the user terminal is allowed to report the QoE measurement report. The network side device may transmit the second indication information to the user terminal to indicate the user terminal to report all QoE measurement reports. After receiving the second indication information, the user terminal reports all the QoE measurement reports.

For another example, if the network side device determines that the user terminal reporting for the QoE measurement report will cause network congestion, it may transmit the third indication information to the user terminal to indicate the user terminal to report the QoE measurement report based on the indicated rules. After receiving the third indication information, the user terminal may report the QoE measurement report based on the indications in the third indication information.

In an embodiment, the—third indication information mentioned above may include any one of the following or a combination thereof.

(1) a timer for reporting the QoE measurement report after expiration, which is used to indicate the user terminal the duration after which to report the QoE measurement report.

(2) a limited size of the reported QoE measurement report, which is used to indicate the user terminal to select a QoE measurement report having an appropriate size for reporting.

(3) the service type corresponding to the reported QoE measurement report, which is used to indicate the user terminal to report the QoE measurement report corresponding to which service type.

(4) the priority of the service type corresponding to the reported QoE measurement report, which is used to indicate the user terminal to report the QoE measurement report corresponding to which priority of the service type.

(5) the QoE measurement ID of the reported QoE measurement report, which is used to indicate the user terminal to report the QoE measurement report corresponding to which QoE measurement ID.

(6) the priority of the QoE measurement ID of the reported QoE measurement report, which is used to indicate the user terminal to report the QoE measurement report corresponding to which priority of the QoE measurement ID.

(7) the configuration type corresponding to the reported QoE measurement report which is used to indicate the user terminal to report the QoE measurement report corresponding to which configuration type.

(8) timing backoff time for reporting the QoE measurement report, which is used to indicate the user terminal how long to wait after the timer expires before reporting the QoE measurement report.

The content included in the third indication information described here may be the same as the content included in the first indication information, or may be different from the content included in the first indication information.

For example, both the first indication information and the third indication information include the timer for reporting the QoE measurement report after expiration, but the time value of the timer may be the same or different.

In the method for reporting QoE measurement reports provided by the embodiments of the present application, the user terminal can report the QoE measurement report and/or the information associated with the QoE measurement report based on the second indication information or the third indication information transmitted from the network side device, to avoid a new round of network side congestion caused by a large number of user terminals reporting a large number of QoE measurement reports when the network side device resumes reporting for the QoE measurement reports from the user terminal.

In an embodiment, the first indication information is time indication information used to indicate the user terminal to report the QoE measurement report. Furthermore, the user terminal can report the QoE measurement report and the information associated with the QoE measurement report based on the time indication information.

In an embodiment of the present application, the network side device can indicate different time indication information to different user terminals by the first indication information, which means that different user terminals report the QoE measurement report at different times.

In an embodiment, the reporting time corresponding to each user terminal for QoE measurement report can be determined based on a terminal ID of the user terminal. For example, a formula can be defined: reporting time=f (UE ID). After calculating reporting time corresponding to each user terminal through the above formula of the reporting time, the network side device transmits the reporting time corresponding to each user terminal to each user terminal by dedicated signaling or broadcast message. After receiving the reporting time, the user terminal reports the QoE measurement report based on the reporting time. In an embodiment, the network side device can also transmit the above-mentioned formula of reporting time to the user terminal by dedicated signaling or broadcast messages. After receiving the reporting time formula, the user terminal can obtain the reporting time corresponding to the user terminal based on the terminal ID and the reporting time formula, and the QoE measurement report is reported based on the reporting time.

In the method for reporting QoE measurement reports provided by the embodiments of the present application, the user terminal can determine the reporting time of the QoE measurement report based on the first indication information transmitted from the network side device, to avoid a new round of network side congestion caused by a large number of user terminals reporting a large number of QoE measurement reports.

The above method is illustrated below through specific embodiments.

Example 1

Step 1: OAM or CN transmits a QoE configuration to a network side device, and the network side device forwards the QoE configuration to a user terminal.

Step 2: after receiving the QoE configuration, the user terminal starts to perform QoE measurements, and reports a QoE measurement report.

Step 3: when the burdens of the network side device are heavy or the user terminal is connected to a network side device that does not support QoE services, the network side device determines to pause reporting for the QoE measurement report from the user terminal, and transmits a command for pausing reporting for the QoE measurement report.

Step 4: after receiving the command for pausing reporting for the QoE measurement report, the user terminal configures to pause reporting for the QoE measurement report based on a pause command.

Step 5: after the burdens of the network side device is alleviated, reporting for the QoE measurement report from the user terminal can be received. Considering that multiple user terminals report and the QoE measurement report is large, the user terminal can be notified in a resume command about how long it will be before reporting the QoE measurement report. In one embodiment, the user terminal can be notified as the following: 1) a size of a QoE measurement report that can be reported, which can be a total size of the QoE measurement reports, or a size of QoE measurement reports corresponding to each service type or a size of QoE measurement reports corresponding to each QoE measurement ID, or a size of QoE measurement reports corresponding to each configuration type; 2) a specified service type or a priority of the service type, which specifies to resume reporting for the QoE measurement report corresponding to which service type, or resume reporting for the QoE measurement report corresponding to which priority of the service type; 3) a specified QoE measurement ID or a priority of the QoE measurement ID, which specifies to resume reporting for the QoE measurement report corresponding to which QoE measurement ID, or resume reporting for the QoE measurement report corresponding to which priority of the QoE measurement ID: 4) a specified QoE configuration type, which specifies to resume reporting for the QoE measurement report corresponding to a signaling-based QoE configuration type or a management-based QoE configuration type; 5) timing backoff time for reporting the QoE measurement report, which indicates how long the backoff time is before reporting the QoE measurement report after the timer expires.

Step 6: after receiving the resume command, the user terminal reports the QoE measurement report based on the configuration of the resume command.

Example 2

Step 1: OAM or CN transmits a QoE configuration to a network side device, and the network side device forwards the QoE configuration to a user terminal and configures a service type.

Step 2: after receiving the QoE configuration, the user terminal starts to perform QoE measurements, and reports a QoE measurement report.

Step 3: when the burdens of the network side device are heavy or the user terminal is connected to a network side device that does not support QoE services, the network side device determines to pause reporting for the QoE measurement report from the user terminal, and transmits a command for pausing reporting for the QoE measurement report.

Step 4: After receiving the command for pausing reporting for the QoE measurement report, the user terminal configures to pause reporting for the QoE measurement report based on a pause command.

Step 5: after the burdens of the network side device is alleviated, reporting for the QoE measurement report from the user terminal can be received. Considering that multiple user terminals report and the QoE measurement report is large, the user terminal can be indicated to report the QoE measurement report in a resume command.

In one embodiment, the user terminal can be notified to report the following relevant information in the resume command: 1) a size of a stored QoE measurement report; 2) storage time of the stored QoE measurement report; 3) a service type corresponding to the stored QoE measurement report and/or a QoE measurement ID of the stored QoE measurement report; 4) a configuration type corresponding to the stored QoE measurement report; 5) a size of a QoE measurement report corresponding to 3) or 4).

Step 6: the user terminal reports the information requested by the network side device in step 5 in dedicated signaling.

Step 7: after receiving the information reported from the user terminal, the network side device determines whether new congestion will be caused based on the reported information such as the size of the QoE measurement report or the storage time of the stored QoE measurement report.

Step 8: if the network side device determines that congestion will not be caused, the user terminal is notified to report the QoE measurement report in dedicated signaling.

Step 9. if the network side device determines that congestion will be caused, the user terminal is notified in the dedicated signaling about how long it will be before reporting the QoE measurement report. In one embodiment, the user terminal can be notified as the following: 1) a size of a QoE measurement report that can be reported, which can be a total size of the QoE measurement reports, or a size of QoE measurement reports corresponding to each service type or a size of QoE measurement reports corresponding to each QoE measurement ID, or a size of QoE measurement reports corresponding to each configuration type; 2) a specified service type or a priority of the service type, which specifies to resume reporting for the QoE measurement report corresponding to which service type, or resume reporting for the QoE measurement report corresponding to which priority of the service type; 3) a specified QoE measurement ID or a priority of the QoE measurement ID, which specifies to resume reporting for the QoE measurement report corresponding to which QoE measurement ID, or resume reporting for the QoE measurement report corresponding to which priority of the QoE measurement ID: 4) a specified QoE configuration type, which specifies to resume reporting for the QoE measurement report corresponding to a signaling-based QoE configuration type or a management-based QoE configuration type; 5) timing backoff time for reporting the QoE measurement report, which indicates how long the backoff time is before reporting the QoE measurement report after the timer expires.

Step 10: after receiving the dedicated signaling of step 9, the user terminal reports the QoE measurement report based on the configuration of the dedicated signaling.

Example 3

Step 1: OAM or CN transmits a QoE configuration to a network side device, and the network side device forwards the QoE configuration to a user terminal and configures a service type.

Step 2: after receiving the QoE configuration, the user terminal starts to perform QoE measurements, and reports a QoE measurement report.

Step 3: when the burdens of the network side device are heavy or the user terminal is connected to a network side device that does not support QoE services, the network side device determines to pause reporting for the QoE measurement report from the user terminal, and transmits a command for pausing reporting for the QoE measurement report.

Step 4: After receiving the command to pause reporting for the QoE measurement report, the user terminal configures to pause reporting for the QoE measurement report based on a pause command.

Step 5: after the burdens of the network side device is alleviated, reporting for the QoE measurement report from the user terminal can be received. Considering that multiple user terminals report and the QoE measurement report is large, the user terminal can be indicated to report the QoE measurement report by a resume command.

Step 6: the user terminal reports one or more QoE measurement reports in dedicated signaling, and pauses reporting for other QoE measurement reports. The user terminal reports one or more QoE measurement reports in dedicated signaling. In one embodiment, at least one of the following information is reported: a size of a remaining QoE measurement report; storage time of the remaining QoE measurement report; a service type corresponding to the remaining QoE measurement report and/or a QoE measurement ID of the remaining QoE measurement report; a size of a QoE measurement report corresponding to the service type and/or a size of a QoE measurement report corresponding to the QoE measurement ID: a configuration type corresponding to the remaining QoE measurement report; a size of a QoE measurement report corresponding to the configuration type; indication about whether the QoE measurement report has been reported.

Step 7: after receiving the information reported from the user terminal, the network side device determines whether new congestion will be caused based on the reported information such as the size of the QoE measurement report or the storage time of the stored QoE measurement report.

Step 8: if the network side device determines that congestion will not be caused, the user terminal is notified to report the QoE measurement report in dedicated signaling.

Step 9. if the network side device determines that congestion will be caused, the user terminal is notified in the dedicated signaling about how long it will be before reporting the QoE measurement report. In one embodiment, the user terminal can be notified as the following: 1) a size of a QoE measurement report that can be reported, which can be a total size of the QoE measurement reports, or a size of QoE measurement reports corresponding to each service type or a size of QoE measurement reports corresponding to each QoE measurement ID, or a size of QoE measurement reports corresponding to each configuration type; 2) a specified service type or a priority of the service type, which specifies to resume reporting for the QoE measurement report corresponding to which service type, or resume reporting for the QoE measurement report corresponding to which priority of the service type; 3) a specified QoE measurement ID or a priority of the QoE measurement ID, which specifies to resume reporting for the QoE measurement report corresponding to which QoE measurement ID, or resume reporting for the QoE measurement report corresponding to which priority of the QoE measurement ID: 4) a specified QoE configuration type, which specifies to resume reporting for the QoE measurement report corresponding to a signaling-based QoE configuration type or a management-based QoE configuration type; 5) timing backoff time for reporting the QoE measurement report, which indicates how long the backoff time is before reporting the QoE measurement report after the timer expires.

Step 10: after receiving the dedicated signaling of step 9, the user terminal reports the QoE measurement report based on the configuration of the dedicated signaling.

Example 4

Step 1: OAM or CN transmits a QoE configuration to a network side device, and the network side device forwards the QoE configuration to a user terminal and configures a service type.

Step 2: after receiving the QoE configuration, the user terminal starts to perform QoE measurements, and reports a QoE measurement report.

Step 3: when the burdens of the network side device are heavy or the user terminal is connected to a network side device that does not support QoE services, the network side device determines to pause reporting for the QoE measurement report from the user terminal, and transmits a command for pausing reporting for the QoE measurement report.

Step 4: After receiving the command to pause reporting for the QoE measurement report, the user terminal configures to pause reporting for the QoE measurement report based on a pause command.

Step 5: after the burdens of the network side device is alleviated, reporting for the QoE measurement report from the user terminal can be received. Considering that multiple user terminals report and the QoE measurement report is large, the user terminals are broken up and reported based on a terminal ID. A formula can be defined: reporting time=f (UE ID). Reporting time of the user terminal is obtained. The network side device transmits the reporting time in dedicated signaling or broadcast messages.

Step 6: when receiving the dedicated signaling or broadcast messages, the user terminal reports based on the reporting time.

Example 5

Step 1: OAM or CN transmits a QoE configuration to a network side device, and the network side device forwards the QoE configuration to a user terminal and configures a service type.

Step 2: after receiving the QoE configuration, the user terminal starts to perform QoE measurements, and reports a QoE measurement report.

Step 3: when the burdens of the network side device are heavy or the user terminal is connected to a network side device that does not support QoE services, the network side device determines to pause reporting for the QoE measurement report from the user terminal, and transmits a command for pausing reporting for the QoE measurement report.

Step 4: After receiving the command to pause reporting for the QoE measurement report, the user terminal configures to pause reporting for the QoE measurement report based on a pause command.

Step 5: after the burdens of the network side device is alleviated, reporting for the QoE measurement report from the user terminal can be received. Considering that multiple user terminals report and the QoE measurement report is large, the user terminal can be indicated to report the QoE measurement report by a resume command. In one embodiment, the user terminal can be notified to report the following relevant information in dedicated signaling: 1) a size of a stored QoE measurement report; 2) storage time of the stored QoE measurement report; 3) a service type corresponding to the stored QoE measurement report and/or a QoE measurement ID of the stored QoE measurement report; 4) a configuration type corresponding to the QoE measurement report; 5) a size of a QoE measurement report corresponding to 3) or 4).

Step 6: the user terminal reports the information requested by the network side device in step 5 in the dedicated signaling.

Step 7: after receiving the information reported from the user terminal, the network side device determines whether new congestion will be caused based on the reported information such as the size of the QoE measurement report or the storage time of the stored QoE measurement report.

Step 8: if the network side device determines that congestion will not be caused, the user terminal is notified to report the QoE measurement report in dedicated signaling.

Step 9: If the network side device determines that congestion will be caused, it is assumed that there are QoE measurement reports 1, 2, and 3 currently. Referring to an immediate service type QoE measurement report 1, such as VR, or QoE measurement report 2 that has long storage time, in order to ensure validities of such service reports, priority will be given to the reporting for these QoE measurement reports. That is, a duration set for reporting the QoE measurement reports 1 and 2 is shorter, and a duration set for reporting the QoE measurement report 3 is longer. The network side device will transmit the above reporting policy to the user terminal.

Step 10: the user terminal reports the QoE measurement report based on the reporting policy.

FIG. 2 is a second schematic flowchart of a method for reporting quality of experience (QoE) measurement reports according to an embodiment of the present application. The method is applied to a network side device. As shown in FIG. 2, the method includes the following steps.

Step 200: transmitting first indication information of one or more QoE measurement reports to a user terminal.

Step 201: receiving a QoE measurement report and/or information associated with the QoE measurement report reported from the user terminal based on the first indication information.

When the network side device resumes reporting for the QoE measurement report from the user terminal, in order to avoid a new round of network side congestion caused by a large number of user terminals reporting a large number of QoE measurement reports, in the embodiment of the present application, the network side device (for example, a next generation NodeB (gNB) of a base station) can transmit the first indication information to the user terminal. After receiving the first indication information, the user terminal can report the QoE measurement report and/or the information associated with the QoE measurement report based on indications in the first indication information.

In an embodiment, the above-mentioned first indication information may be included in various dedicated signaling or broadcast messages, and is not specifically limited here.

In the method for reporting QoE measurement reports provided by the embodiments of the present application, the network side device can transmit the first indication information to the user terminal to control the user terminal to report the QoE measurement report and/or the information associated with the QoE measurement report, to avoid a new round of network side congestion caused by a large number of user terminals reporting a large number of QoE measurement reports when the network side device resumes reporting for the QoE measurement reports from the user terminal.

In an embodiment, the above-mentioned first indication information may include one or more of the following.

(1) A QoE Measurement Identifier (ID) of a Reported QoE Measurement Report.

The network side device may transmit the first indication information to the user terminal, where the first indication information includes the QoE measurement ID of the reported QoE measurement report, that is, the network side device indicates to resume reporting for the QoE measurement report corresponding to which QoE measurement ID. After receiving the first indication information, the user terminal can determine to report the QoE measurement report corresponding to which QoE measurement ID based on the first indication information, and then select the QoE measurement report corresponding to the determined QoE measurement ID for reporting. The first indication information may indicate one or more QoE measurement IDs.

In an embodiment, the above QoE measurement ID may be the QoE reference.

It should be noted that QoE measurement IDs corresponding to each QoE configuration may be carried by the network side device in a QoE measurement configuration message and transmitted to the user terminal, and the user terminal can determine the QoE measurement report corresponding to the QoE configuration based on the QoE measurement ID.

(2) A Timer for Reporting the QoE Measurement Report after Expiration.

The network side device may transmit the first indication information to the user terminal, where the first indication information includes the timer for reporting the QoE measurement report after expiration. For example, the timer is set to 30 milliseconds, that is, the user terminal is indicated to report the QoE measurement report after the timer expires in 30 milliseconds. After receiving the first indication information, the user terminal can determine the duration after which to report the QoE measurement report based on the timer in the first indication information.

(3) A Limited Size of the Reported QoE Measurement Report.

The network side device may transmit the first indication information to the user terminal, where the first indication information includes the limited size of the reported QoE measurement report. For example, the total size of the QoE measurement reports that can be reported from the user terminal may be limited, or a size of a QoE measurement report corresponding to the service type corresponding to the reported QoE measurement report and a size of a QoE measurement report corresponding to the QoE measurement ID of the reported QoE measurement report may be limited, or a size of a QoE measurement report corresponding to the configuration type corresponding to the reported QoE measurement report may be limited. After receiving the first indication information, the user terminal can determine the size of the QoE measurement report that can be reported based on the first indication information, and select a QoE measurement report having an appropriate size for reporting.

(4) A Service Type Corresponding to the Reported QoE Measurement Report.

The network side device may transmit the first indication information to the user terminal, where the first indication information includes the service type corresponding to the reported QoE measurement report, that is, the network side device indicates to resume reporting for the QoE measurement report corresponding to which service type. After receiving the first indication information, the user terminal can determine to report the QoE measurement report corresponding to which service type based on the first indication information, and select the QoE measurement report corresponding to the service type for reporting. The first indication information may indicate one or more service types.

(5) A Priority of the Service Type Corresponding to the Reported QoE Measurement Report.

The network side device may transmit the first indication information to the user terminal, where the first indication information includes the priority of the service type corresponding to the reported QoE measurement report, that is, the network side device indicates to resume reporting for the QoE measurement report corresponding to which priority of the service type. After receiving the first indication information, the user terminal can determine to report the QoE measurement report corresponding to which priority of the service type based on the first indication information, and select the corresponding QoE measurement report for reporting. Priorities of each service type can be pre-configured to the user terminal by OAM or CN or network side device, or can be transmitted to the user terminal by dedicated signaling or broadcast messages.

(6) A Priority of the QoE Measurement ID of the Reported QoE Measurement Report.

The network side device may transmit the first indication information to the user terminal, where the first indication information includes the priority of the QoE measurement ID of the reported QoE measurement report, that is, the network side device indicates to resume reporting for the QoE measurement report corresponding to which priority of the QoE measurement ID. After receiving the first indication information, the user terminal can determine to report the QoE measurement report corresponding to which priority of the QoE measurement ID based on the first indication information, and select the corresponding QoE measurement report for reporting. Priorities of each QoE measurement ID can be pre-configured to the user terminal by OAM or CN or network side device, or can be transmitted to the user terminal by dedicated signaling or broadcast messages.

(7) A Configuration Type Corresponding to the Reported QoE Measurement Report.

The network side device may transmit the first indication information to the user terminal, where the first indication information includes the configuration type corresponding to the reported QoE measurement report, that is, the network side device indicates to resume reporting for the QoE measurement report corresponding to which configuration type. For example, the network side device may indicate to resume the QoE measurement report corresponding to a signaling-based QoE configuration type, or the network side device may indicate to resume the QoE measurement report of a management-based QoE configuration type. After receiving the first indication information, the user terminal may determine to report the QoE measurement report corresponding to which configuration type, and select the corresponding QoE measurement report for reporting.

(8) Timing Backoff Time for Reporting the QoE Measurement Report.

The network side device may transmit the first indication information to the user terminal, where the first indication information includes the timing backoff time for reporting the QoE measurement report, that is, the network side device indicates the user terminal how long to wait after the timer expires (i.e. the timing backoff time) before reporting the QoE measurement report. For example, if the timer is set to 30 milliseconds and the timing backoff time is set to 10 milliseconds, the user terminal is indicated to wait 10 milliseconds after the 30 millisecond timer expires to report the QoE measurement report. After receiving the first indication information, the user terminal can determine the duration after which to report the QoE measurement report based on the timing backoff time in the first indication information. The timer may be pre-configured from the network side device to the user terminal, or may be transmitted from the network side device to the user terminal by dedicated signaling or broadcast messages.

In the method for reporting QoE measurement reports provided by the embodiments of the present application, the network side device can transmit the first indication information to the user terminal to control the user terminal to report the QoE measurement report, to avoid a new round of network side congestion caused by a large number of user terminals reporting a large number of QoE measurement reports when the network side device resumes reporting for the QoE measurement reports from the user terminal.

In an embodiment, the receiving the QoE measurement report and/or the information associated with the QoE measurement report reported from the user terminal based on the first indication information includes:

receiving a QoE measurement report stored after the reporting for the QoE measurement report is paused and/or information associated with the QoE measurement report stored after reporting for the QoE measurement report is paused reported from the user terminal based on the first indication information.

In various embodiments of the present application, the QoE measurement report and/or the information associated with the QoE measurement report reported from the user terminal to the network side device may refer to the QoE measurement report stored by the user terminal after reporting for the QoE measurement report is paused and/or information associated with the QoE measurement report stored by the user terminal after reporting for the QoE measurement report is paused.

In an embodiment, the methods provided by various embodiments of the present application can be applied to a scenario where reporting for the QoE measurement report is resumed after being paused.

In an embodiment, the receiving the QoE measurement report stored after the reporting for the QoE measurement report is paused and the information associated with the QoE measurement report stored after reporting for the QoE measurement report is paused reported from the user terminal based on the first indication information includes:

receiving the QoE measurement report reported from the user terminal based on the first indication information, and further receiving information of a remaining QoE measurement report reported from the user terminal, where the information of the remaining QoE measurement report includes one or more of the following information:

a size of the remaining QoE measurement report;

storage time of the remaining QoE measurement report;

a service type corresponding to the remaining QoE measurement report and/or a QoE measurement ID of the remaining QoE measurement report;

a size of a QoE measurement report corresponding to the service type corresponding to the remaining QoE measurement report and/or a size of a QoE measurement report corresponding to the QoE measurement ID of the remaining QoE measurement report;

a configuration type corresponding to the remaining QoE measurement report;

a size of a QoE measurement report corresponding to the configuration type corresponding to the remaining QoE measurement report; and a first ID used to indicate whether the QoE measurement report has been reported.

In an embodiment of the present application, when the user terminal reports the QoE measurement report based on the first indication information, it may also report one or more of the following to the network side device: the size of the remaining QoE measurement report, the storage time of the remaining QoE measurement report, the service type corresponding to the remaining QoE measurement report, the QoE measurement ID of the remaining QoE measurement report, the configuration type corresponding to the remaining QoE measurement report, the size of the QoE measurement report corresponding to the service type corresponding to the remaining QoE measurement report, the size of the QoE measurement report corresponding to the QoE measurement ID of the remaining QoE measurement report, the size of the QoE measurement report corresponding to the configuration type corresponding to the remaining QoE measurement report, and the first ID used to indicate whether the QoE measurement report has been reported. After receiving the information, the network side device can determine how to control the user terminal to report the QoE measurement report in the future.

In the method for reporting QoE measurement reports provided by the embodiments of the present application, the network side device can further receive the information of the remaining QoE measurement report reported from the user terminal when receiving the QoE measurement report reported from the user terminal, to determine how to control the user terminal to report the QoE measurement report in the future.

In an embodiment, the transmitting the first indication information of one or more QoE measurement reports to the user terminal includes:

transmitting, to the user terminal, the first indication information for requesting to obtain the information associated with the QoE measurement report, where the first indication information includes one or more of the following:

a request for reporting a size of a stored QoE measurement report;

a request for reporting storage time of the stored QoE measurement report;

a request for reporting a service type corresponding to the stored QoE measurement report and/or a QoE measurement ID of the stored QoE measurement report;

a request for reporting a size of a QoE measurement report corresponding to the service type corresponding to the stored QoE measurement report and/or a size of a QoE measurement report corresponding to the QoE measurement ID of the stored QoE measurement report;

a request for reporting a configuration type corresponding to the stored QoE measurement report; and a request for reporting a size of a QoE measurement report corresponding to the configuration type corresponding to the stored QoE measurement report.

In the embodiment of the present application, the network side device may transmit first indication information to the user terminal. The first indication information is used to request to obtain the information associated with the QoE measurement report. For example, the user terminal may be requested to report the size of the stored QoE measurement report, the size of the QoE measurement report corresponding to the service type corresponding to the stored QoE measurement report and/or the size of the QoE measurement report corresponding to the QoE measurement ID of the stored QoE measurement report, the size of the QoE measurement report corresponding to the configuration type corresponding to the stored QoE measurement report, the storage time of the stored QoE measurement report, the service type corresponding to the stored QoE measurement report and/or the QoE measurement ID of the stored QoE measurement report, the configuration type corresponding to the stored QoE measurement report, etc. After receiving the first indication information, the user terminal can report the information associated with the QoE measurement report requested by the network side device based on the indications in the first indication information, and the network side device can determine how to control the user terminal to report the QoE measurement reports in the future.

In the method for reporting QoE measurement reports provided by the embodiments of the present application, the network side device can request the user terminal to report the information associated with the QoE measurement report, to determine how to control the user terminal to report the QoE measurement report in the future, to avoid a new round of network side congestion caused by a large number of user terminals reporting a large number of QoE measurement reports.

In an embodiment, the method further includes:

receiving one or more of the following information associated with the QoE measurement report reported from the user terminal;

the size of the stored QoE measurement report;

the storage time of the stored QoE measurement report;

the service type corresponding to the stored QoE measurement report and/or the QoE measurement ID of the stored QoE measurement report;

a size of a QoE measurement report corresponding to the service type corresponding to the stored QoE measurement report and/or a size of a QoE measurement report corresponding to the QoE measurement ID of the stored QoE measurement report;

the configuration type corresponding to the stored QoE measurement report;

a size of a QoE measurement report corresponding to the configuration type corresponding to the stored QoE measurement report; and the first ID used to indicate whether the QoE measurement report has been reported.

In the embodiment of the present application, after receiving an indication for requesting to obtain the information associated with the QoE measurement report transmitted from the network side device, the user terminal transmit various information associated with the QoE measurement report to the network side device. For example, it may be one or more of the following information: the size of the QoE measurement report stored by the user terminal, the size of the QoE measurement report corresponding to the service type corresponding to the QoE measurement report stored by the user terminal, the size of the QoE measurement report corresponding to the QoE measurement ID of the QoE measurement report stored by the user terminal, the size of the QoE measurement report corresponding to the configuration type corresponding to the QoE measurement report stored by the user terminal, the storage time of the stored QoE measurement report stored by the user terminal, the service type corresponding to the QoE measurement report stored by the user terminal, the QoE measurement ID of the QoE measurement report stored by the user terminal, the configuration type corresponding to the QoE measurement report stored by the user terminal, and the first ID used to indicate whether the QoE measurement report has been reported. After receiving the information, the network side device can determine how to control the user terminal to report the QoE measurement report in the future.

In the method for reporting QoE measurement reports provided by the embodiments of the present application, the network side device can receive various information associated with the QoE measurement report reported from the user terminal, to determine how to control the user terminal to report the QoE measurement report in the future, to avoid a new round of network side congestion caused by a large number of user terminals reporting a large number of QoE measurement reports.

In an embodiment, the first indication information is a second ID that indicates the user terminal to resume reporting a QoE measurement report.

In an embodiment of the present application, the network side device may transmit the first indication information to the user terminal, where the first indication information is a second ID that indicates the user terminal to resume reporting the QoE measurement report. After the user terminal receives the first indication information, it can independently determine how to report the QoE measurement report and/or the information associated with the QoE measurement report to the network side device, as well as specific content for reporting. For example, the user terminal may independently determine to report one or more QoE measurement reports to the network side device first, or may independently determine to report information associated with the stored QoE measurement report to the network side device, or may independently determine prioritize reporting a QoE measurement report that has been stored for longer periods of time, or prioritize reporting a QoE measurement report corresponding to an immediate service type (such as VR), etc.

In an embodiment, the method further includes:

receiving one or more QoE measurement reports reported from the user terminal, and further receiving one or more of the following information reported from the user terminal;

a size of the remaining QoE measurement report;

storage time of the remaining QoE measurement report;

a service type corresponding to the remaining QoE measurement report and/or a QoE measurement ID of the remaining QoE measurement report;

a size of a QoE measurement report corresponding to the service type and/or a size of a QoE measurement report corresponding to the QoE measurement ID;

a configuration type corresponding to the remaining QoE measurement report;

a size of a QoE measurement report corresponding to the configuration type; and a first ID used to indicate whether the QoE measurement report has been reported.

In an embodiment of the present application, after receiving the second identifier indicating that the user terminal resumes reporting for the QoE measurement report, the user terminal may independently determine to report one or more QoE measurement reports to the network side device first, or may independently determine to report information associated with the stored QoE measurement report to the network side device, and reports, to the network side device, one or more of the following to the network side device: the size of the remaining QoE measurement report, the storage time of the remaining QoE measurement report, the service type corresponding to the remaining QoE measurement report, the QoE measurement ID of the remaining QoE measurement report, the configuration type corresponding to the remaining QoE measurement report, the size of the QoE measurement report corresponding to the service type corresponding to the remaining QoE measurement report, the size of the QoE measurement report corresponding to the QoE measurement ID of the remaining QoE measurement report, the size of the QoE measurement report corresponding to the configuration type corresponding to the remaining QoE measurement report, and the first ID used to indicate whether the QoE measurement report has been reported. After receiving the information, the network side device can determine how to control the user terminal to report the QoE measurement report in the future.

In the method for reporting QoE measurement reports provided by the embodiments of the present application, the network side device can further receive the information associated with the remaining QoE measurement report reported from the user terminal when receiving the QoE measurement report reported from the user terminal, to determine how to control the user terminal to report the QoE measurement report in the future.

In an embodiment, the method further includes:

transmitting second indication information to the user terminal, where the second indication information is used to indicate the user terminal to report all QoE measurement reports;

or, transmitting third indication information to the user terminal, where the third indication information is used to indicate the user terminal to report a QoE measurement report, where the third indication information includes one or more of the following:

a timer for reporting the QoE measurement report after expiration;

a limited size of the reported QoE measurement report;

a service type corresponding to the reported QoE measurement report;

a priority of the service type corresponding to the reported QoE measurement report;

a QoE measurement ID of the reported QoE measurement report;

a priority of the QoE measurement ID of the reported QoE measurement report;

a configuration type corresponding to the reported QoE measurement report; and timing backoff time for reporting the QoE measurement report.

After the user terminal reports the information associated with the QoE measurement report stored by the user terminal or remaining QoE measurement report stored by the user terminal to the network side device based on the received first indication information, the network side device can determine how to control the user terminal to report the QoE measurement report in the future based on the information associated with these QoE measurement reports.

For example, if the network side device determines that the user terminal reporting for the QoE measurement report will not cause network congestion, the user terminal is allowed to report the QoE measurement report. The second indication information can be transmitted to the user terminal to indicate the user terminal to report all QoE measurement reports. After receiving the second indication information, the terminal reports all QoE measurement reports.

For another example, if the network side device determines that the user terminal reporting for the QoE measurement report will cause network congestion, it may transmit the third indication information to the user terminal to indicate the user terminal to report the QoE measurement report based on the indicated rules. After receiving the third indication information, the user terminal may report the QoE measurement report based on the indications in the third indication information.

In an embodiment, the third indication information mentioned above may include any one of the following or a combination thereof.

(1) a timer for reporting the QoE measurement report after expiration, which is used to indicate the user terminal the duration after which to report the QoE measurement report.

(2) the limited size of the reported QoE measurement report, which is used to indicate the user terminal to select a QoE measurement report having an appropriate size for reporting.

(3) the service type corresponding to the reported QoE measurement report, which is used to indicate the user terminal to report the QoE measurement report corresponding to which service type.

(4) the priority of the service type corresponding to the reported QoE measurement report, which is used to indicate the user terminal to report the QoE measurement report corresponding to which priority of the service type.

(5) the QoE measurement ID of the reported QoE measurement report, which is used to indicate the user terminal to report the QoE measurement report corresponding to which QoE measurement ID.

(6) the priority of the QoE measurement ID of the reported QoE measurement report, which is used to indicate the user terminal to report the QoE measurement report corresponding to which priority of the QoE measurement ID.

(7) the configuration type corresponding to the reported QoE measurement report which is used to indicate the user terminal to report the QoE measurement report corresponding to which configuration type.

(8) the timing backoff time for reporting the QoE measurement report, which is used to indicate the user terminal how long to wait after the timer expires before reporting the QoE measurement report.

In the method for reporting QoE measurement reports provided by the embodiments of the present application, the network side device can transmit the second indication information or the third indication information to the user terminal to control the user terminal to report the QoE measurement report, to avoid a new round of network side congestion caused by a large number of user terminals reporting a large number of QoE measurement reports when the network side device resumes reporting for the QoE measurement reports from the user terminal.

In an embodiment, the first indication information is time indication information used to indicate the user terminal to report the QoE measurement report.

In an embodiment of the present application, the network side device may indicate reporting time of different QoE measurement reports to different user terminals by the first indication information.

In an embodiment, the reporting time corresponding to each user terminal for QoE measurement report can be determined based on a terminal ID of the user terminal. For example, a formula can be defined: reporting time=f (UE ID). After calculating reporting time corresponding to each user terminal through the above formula of the reporting time, the network side device transmits the reporting time corresponding to each user terminal to each user terminal by dedicated signaling or broadcast message. After receiving the reporting time, the user terminal reports the QoE measurement report based on the reporting time. In an embodiment, the network side device can also transmit the above-mentioned formula of reporting time to the user terminal by dedicated signaling or broadcast messages. After receiving the reporting time formula, the user terminal can obtain the reporting time corresponding to the user terminal based on the terminal ID and the reporting time formula, and the QoE measurement report is reported based on the reporting time.

In the method for reporting QoE measurement reports provided by the embodiments of the present application, the network side device can transmit the first indication information to the user terminal to allocate reporting time of different QoE measurement reports to different user terminals, to avoid a new round of network side congestion caused by a large number of user terminals reporting a large number of QoE measurement reports.

The methods and the devices are based on the same disclosed concept, the implementation of the devices and the methods can be referred to each other since the principles of the methods and the devices are similar, and the repetition will not be repeated.

FIG. 3 is a schematic structural diagram of a user terminal according to an embodiment of the present application. As shown in FIG. 3, the user terminal includes a memory 320, a transceiver 310, and a processor 300, where the processor 300 and the memory 320 may also be arranged physically separately.

The memory 320 is used to store computer programs: and the transceiver 310 is used to transmit and receive data under the control of the processor 300.

The transceiver 310 is used to receive and transmit data under the control of the processor 300.

In FIG. 3, a bus architecture may include any number of interconnected buses and bridges, which are linked together through various circuits of one or more processors represented by processor 300 and one or more memories represented by the memory 320. The bus architecture may also link together various other circuits, such as peripherals, voltage regulators, and power management circuits, which are well known in the art, and therefore will not be further described in the present application. The bus interface provides an interface. Transceiver 310 may be multiple elements, i.e., including a transmitter and a receiver, devices for providing communication with various other devices over transmission media including wireless channels, wired channels, fiber optic cables, and the like. For different user equipment, the user interface 330 may also be an interface capable of externally or internally connecting the required equipment, and the connected equipment includes, but not limited to, a keypad, a display, a speaker, a microphone, a joystick, and the like.

The processor 300 is responsible for managing the bus architecture and general processing, and the memory 320 may store data used by the processor 300 when performing operations.

The processor 300 may be a central processing unit (CPU), an application specific integrated circuit (ASIC), a field-programmable gate array (FPGA), or a complex programmable logic device (CPLD), the processor can also use a multi-core architecture.

The processor 300 is configured to perform any one of the methods of the embodiments of the present application when executing the executable instructions by calling the computer program stored in the memory 320. For, example, the method includes: receiving first indication information of one or more quality of experience (QoE) measurement reports transmitted from a network side device: and reporting a QoE measurement report and/or information associated with the QoE measurement report to the network side device based on the first indication information.

In an embodiment, the first indication information is used to indicate reporting for the QoE measurement report, and the first indication information includes one or more of the following: a timer for reporting the QoE measurement report after expiration; a limited size of the reported QoE measurement report; a service type corresponding to the reported QoE measurement report; a priority of the service type corresponding to the reported QoE measurement report; a QoE measurement identifier (ID) of a reported QoE measurement report; a priority of the QoE measurement ID of the reported QoE measurement report; a configuration type corresponding to the reported QoE measurement report; and timing backoff time for reporting the QoE measurement report.

In an embodiment, the reporting the QoE measurement report and/or the information associated with the QoE measurement report to the network side device includes: reporting, to the network side device, a QoE measurement report stored after reporting for the QoE measurement report is paused and/or information associated with the QoE measurement report stored after reporting for the QoE measurement report is paused.

In an embodiment, the method is applied to a scenario where reporting for the QoE measurement report is resumed after being paused.

In an embodiment, the reporting the QoE measurement report and the information associated with the QoE measurement report to the network side device based on the first indication information includes: reporting the QoE measurement report to the network side device based on the first indication information, and further reporting information of a remaining QoE measurement report to the network side device, where the information of the remaining QoE measurement report includes one or more of the following information: a size of the remaining QoE measurement report; storage time of the remaining QoE measurement report; a service type corresponding to the remaining QoE measurement report and/or a QoE measurement ID of the remaining QoE measurement report; a size of a QoE measurement report corresponding to the service type corresponding to the remaining QoE measurement report and/or a size of a QoE measurement report corresponding to the QoE measurement ID of the remaining QoE measurement report; a configuration type corresponding to the remaining QoE measurement report; a size of a QoE measurement report corresponding to the configuration type corresponding to the remaining QoE measurement report; and a first ID used to indicate whether the QoE measurement report has been reported.

In an embodiment, the first indication information is used to request to obtain the information associated with the QoE measurement report, and the first indication information includes one or more of the following: a request for reporting a size of a stored QoE measurement report; a request for reporting storage time of the stored QoE measurement report; a request for reporting a service type corresponding to the stored QoE measurement report and/or a QoE measurement ID of the stored QoE measurement report; a request for reporting a size of a QoE measurement report corresponding to the service type corresponding to the stored QoE measurement report and/or a size of a QoE measurement report corresponding to the QoE measurement ID of the stored QoE measurement report; a request for reporting a configuration type corresponding to the stored QoE measurement report; and a request for reporting a size of a QoE measurement report corresponding to the configuration type corresponding to the stored QoE measurement report.

In an embodiment, the information associated with the QoE measurement report includes one or more of the following: the size of the stored QoE measurement report; the storage time of the stored QoE measurement report; the service type corresponding to the stored QoE measurement report and/or the QoE measurement ID of the stored QoE measurement report; a size of a QoE measurement report corresponding to the service type corresponding to the stored QoE measurement report and/or a size of a QoE measurement report corresponding to the QoE measurement ID of the stored QoE measurement report; the configuration type corresponding to the stored QoE measurement report; a size of a QoE measurement report corresponding to the configuration type corresponding to the stored QoE measurement report; and the first ID used to indicate whether the QoE measurement report has been reported.

In an embodiment, the first indication information is a second identifier indicating that the user terminal resumes reporting for the QoE measurement report.

In an embodiment, the method further includes: receiving second indication information transmitted from the network side device, where the second indication information is used to indicate the user terminal to report all QoE measurement reports: or, receiving third indication information transmitted from the network side device, where the third indication information is used to indicate the user terminal to report a QoE measurement report, where the third indication information includes one or more of the following: a timer for reporting the QoE measurement report after expiration; a limited size of the reported QoE measurement report; a service type corresponding to the reported QoE measurement report; a priority of the service type corresponding to the reported QoE measurement report; a QoE measurement ID of the reported QoE measurement report; a priority of the QoE measurement ID of the reported QoE measurement report; a configuration type corresponding to the reported QoE measurement report; and timing backoff time for reporting the QoE measurement report.

In an embodiment, the first indication information is time indication information used to indicate the user terminal to report the QoE measurement report.

In an embodiment, the time indication information is determined based on a terminal ID of the user terminal.

FIG. 4 is a schematic structural diagram of a network side device according to an embodiment of the present application. As shown in FIG. 4, the network side device includes a memory 420, a transceiver 410, and a processor 400, where the processor 400 and the memory 420 may also be arranged physically separately.

The memory 420 is used to store computer programs: the transceiver 410 is used to transmit and receive data under the control of the processor 400.

The transceiver 410 is used to receive and send data under the control of the processor 400.

In FIG. 4, a bus architecture may include any number of interconnected buses and bridges, which are linked together through various circuits of one or more processors represented by processor 400 and one or more memories represented by the memory 420. The bus architecture may also link together various other circuits, such as peripherals, voltage regulators, and power management circuits, which are well known in the art, and therefore will not be further described in the present application. The bus interface provides an interface. The transceiver 410 may be multiple elements, i.e., including a transmitter and a receiver, devices for providing communication with various other devices over transmission media including wireless channels, wired channels, fiber optic cables, and the like.

The processor 400 is responsible for managing the bus architecture and general processing, and the memory 420 may store data used by the processor 400 when performing operations.

The processor 400 may be a CPU, ASIC, FPGA or CPLD, and the processor may also use a multi-core architecture.

The processor 401 is configured to perform any one of the methods of the embodiments of the present application when executing the executable instructions by calling the computer program stored in the memory 402. For example, the method includes: transmitting first indication information of one or more QoE measurement reports to a user terminal; and receiving a QoE measurement report and/or information associated with the QoE measurement report reported from the user terminal based on the first indication information.

In an embodiment, the receiving the QoE measurement report and/or the information associated with the QoE measurement report reported from the user terminal based on the first indication information includes: receiving a QoE measurement report stored after reporting for the QoE measurement report is paused and/or information associated with the QoE measurement report stored after reporting for the QoE measurement report is paused reported from the user terminal.

In an embodiment, the method is applied to a scenario where reporting for the QoE measurement report is resumed after being paused.

In an embodiment, the receiving the QoE measurement report and the information associated with the QoE measurement report reported from the user terminal based on the first indication information includes: receiving the QoE measurement report reported from the user terminal based on the first indication information, and further receiving information of a remaining QoE measurement report reported from the user terminal, where the information of the remaining QoE measurement report includes one or more of the following information: a size of the remaining QoE measurement report; storage time of the remaining QoE measurement report; a service type corresponding to the remaining QoE measurement report and/or a QoE measurement ID of the remaining QoE measurement report; a size of a QoE measurement report corresponding to the service type corresponding to the remaining QoE measurement report and/or a size of a QoE measurement report corresponding to the QoE measurement ID of the remaining QoE measurement report; a configuration type corresponding to the remaining QoE measurement report; a size of a QoE measurement report corresponding to the configuration type corresponding to the remaining QoE measurement report; and a first ID used to indicate whether the QoE measurement report has been reported.

In an embodiment, the transmitting the first indication information of one or more QoE measurement reports to the user terminal includes: transmitting, to the user terminal, the first indication information for requesting to obtain the information associated with the QoE measurement report, where the first indication information includes one or more of the following: a request for reporting a size of a stored QoE measurement report; a request for reporting storage time of the stored QoE measurement report; a request for reporting a service type corresponding to the stored QoE measurement report and/or a QoE measurement ID of the stored QoE measurement report; a request for reporting a size of a QoE measurement report corresponding to the service type corresponding to the stored QoE measurement report and/or a size of a QoE measurement report corresponding to the QoE measurement ID of the stored QoE measurement report; a request for reporting a configuration type corresponding to the stored QoE measurement report; and a request for reporting a size of a QoE measurement report corresponding to the configuration type corresponding to the stored QoE measurement report.

In an embodiment, the method further includes: transmitting second indication information to the user terminal, where the second indication information is used to indicate the user terminal to report all QoE measurement reports: or, transmitting third indication information to the user terminal, where the third indication information is used to indicate the user terminal to report a QoE measurement report, where the third indication information includes one or more of the following: a timer for reporting the QoE measurement report after expiration; a limited size of the reported QoE measurement report; a service type corresponding to the reported QoE measurement report; a priority of the service type corresponding to the reported QoE measurement report; a QoE measurement ID of the reported QoE measurement report; a priority of the QoE measurement ID of the reported QoE measurement report; a configuration type corresponding to the reported QoE measurement report; and timing backoff time for reporting the QoE measurement report.

In an embodiment, the first indication information includes one or more of the following: a timer for reporting the QoE measurement report after expiration; a limited size of the reported QoE measurement report; a service type corresponding to the reported QoE measurement report; a priority of the service type corresponding to the reported QoE measurement report; a QoE measurement ID of the reported QoE measurement report; a priority of the QoE measurement ID of the reported QoE measurement report; a configuration type corresponding to the reported QoE measurement report; and timing backoff time for reporting the QoE measurement report.

In an embodiment, the method further includes: when receiving the QoE measurement report reported from the user terminal, and further receiving one or more of the following information reported from the user terminal; a size of the remaining QoE measurement report; storage time of the remaining QoE measurement report; a service type corresponding to the remaining QoE measurement report and/or a QoE measurement ID of the remaining QoE measurement report; a size of a QoE measurement report corresponding to the service type and/or a size of a QoE measurement report corresponding to the QoE measurement ID: a configuration type corresponding to the remaining QoE measurement report; a size of a QoE measurement report corresponding to the configuration type; and a first ID used to indicate whether the QoE measurement report has been reported.

In an embodiment, the first indication information is used to request to obtain the information associated with the QoE measurement report, and the first indication information includes one or more of the following: a request for reporting a size of a stored QoE measurement report; a request for reporting storage time of the stored QoE measurement report; a request for reporting a service type corresponding to the stored QoE measurement report and/or a QoE measurement ID of the stored QoE measurement report; a request for reporting a size of a QoE measurement report corresponding to the service type corresponding to the stored QoE measurement report and/or a size of a QoE measurement report corresponding to the QoE measurement ID of the stored QoE measurement report; a request for reporting a configuration type corresponding to the stored QoE measurement report; and a request for reporting a size of a QoE measurement report corresponding to the configuration type corresponding to the stored QoE measurement report.

In an embodiment, the method further includes: receiving one or more of the following information associated with the QoE measurement report reported from the user terminal; the size of the stored QoE measurement report; the storage time of the stored QoE measurement report; the service type corresponding to the stored QoE measurement report and/or the QoE measurement ID of the stored QoE measurement report; a size of a QoE measurement report corresponding to the service type corresponding to the stored QoE measurement report and/or a size of a QoE measurement report corresponding to the QoE measurement ID of the stored QoE measurement report; the configuration type corresponding to the stored QoE measurement report; a size of a QoE measurement report corresponding to the configuration type corresponding to the stored QoE measurement report; and the first ID used to indicate whether the QoE measurement report has been reported.

In an embodiment, the first indication information is a second identifier indicating that the user terminal resumes reporting for the QoE measurement report.

In an embodiment, the method further includes: receiving one or more QoE measurement reports reported from the user terminal, and further receiving one or more of the following information reported from the user terminal; a size of the remaining QoE measurement report; storage time of the remaining QoE measurement report; a service type corresponding to the remaining QoE measurement report and/or a QoE measurement ID of the remaining QoE measurement report; a size of a QoE measurement report corresponding to the service type and/or a size of a QoE measurement report corresponding to the QoE measurement ID: a configuration type corresponding to the remaining QoE measurement report; a size of a QoE measurement report corresponding to the configuration type; and a first ID used to indicate whether the QoE measurement report has been reported.

In an embodiment, the method further includes: transmitting second indication information to the user terminal based on the transmitted first indication information, where the second indication information is default information, and the default information is used to indicate the user terminal to report all QoE measurement reports: or, transmitting third indication information to the user terminal based on the transmitted first indication information, where the third indication information is used to indicate the user terminal to report a QoE measurement report, where the third indication information includes one or more of the following: a timer for reporting the QoE measurement report after expiration; a limited size of the reported QoE measurement report; a service type corresponding to the reported QoE measurement report; a priority of the service type corresponding to the reported QoE measurement report; a QoE measurement ID of the reported QoE measurement report; a priority of the QoE measurement ID of the reported QoE measurement report; a configuration type corresponding to the reported QoE measurement report; and timing backoff time for reporting the QoE measurement report.

In an embodiment, the first indication information is time indication information used to indicate the user terminal to report the QoE measurement report.

In an embodiment, the time indication information is determined based on the terminal ID of the user terminal.

It should be noted here that the above-mentioned user terminal and the network side device according to the embodiments of the present application can implement all the method steps implemented by the above-mentioned method embodiments, and can achieve the same effect. The same parts and beneficial effects as the same method embodiments will not be repeated here.

Figure 5:
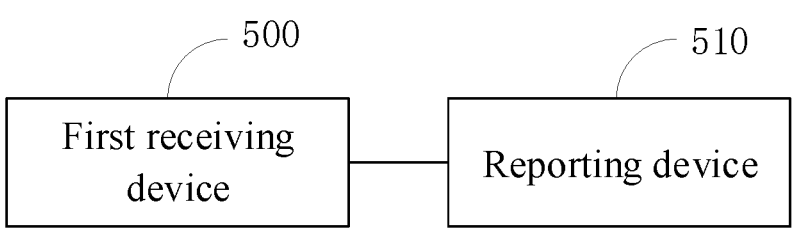
FIG. 5 is a first schematic structural diagram of an apparatus for reporting quality of experience (QoE) measurement reports according to an embodiment of the present application.

FIG. 5 is a schematic structural diagram of an apparatus for reporting quality of experience (QoE) measurement reports according to an embodiment of the present application. The apparatus is applied to a user terminal. As shown in FIG. 5, the apparatus includes the following devices.

A first receiving device 500 is used for receiving first indication information of one or more QoE measurement reports transmitted from a network side device: and A reporting device 510 is used for reporting a QoE measurement report and/or information associated with the QoE measurement report to the network side device based on the first indication information.

In an embodiment, the first indication information is used to indicate reporting for the QoE measurement report, and the first indication information includes one or more of the following: a timer for reporting the QoE measurement report after expiration; a limited size of the reported QoE measurement report; a service type corresponding to the reported QoE measurement report; a priority of the service type corresponding to the reported QoE measurement report; a QoE measurement identifier (ID) of a reported QoE measurement report; a priority of the QoE measurement ID of the reported QoE measurement report; a configuration type corresponding to the reported QoE measurement report; and timing backoff time for reporting the QoE measurement report.

In an embodiment, the reporting the QoE measurement report and/or the information associated with the QoE measurement report to the network side device includes: reporting, to the network side device, a QoE measurement report stored after reporting for the QoE measurement report is paused and/or information associated with the QoE measurement report stored after reporting for the QoE measurement report is paused.

In an embodiment, the apparatus is applied to a scenario where reporting for the QoE measurement report is resumed after being paused.

In an embodiment, the reporting the QoE measurement report and the information associated with the QoE measurement report to the network side device based on the first indication information includes: reporting the QoE measurement report to the network side device based on the first indication information, and further reporting information of a remaining QoE measurement report to the network side device, where the information of the remaining QoE measurement report includes one or more of the following information: a size of the remaining QoE measurement report; storage time of the remaining QoE measurement report; a service type corresponding to the remaining QoE measurement report and/or a QoE measurement ID of the remaining QoE measurement report; a size of a QoE measurement report corresponding to the service type corresponding to the remaining QoE measurement report and/or a size of a QoE measurement report corresponding to the QoE measurement ID of the remaining QoE measurement report; a configuration type corresponding to the remaining QoE measurement report; a size of a QoE measurement report corresponding to the configuration type corresponding to the remaining QoE measurement report; and a first ID used to indicate whether the QoE measurement report has been reported.

In an embodiment, the first indication information is used to request to obtain the information associated with the QoE measurement report, and the first indication information includes one or more of the following: a request for reporting a size of a stored QoE measurement report; a request for reporting storage time of the stored QoE measurement report; a request for reporting a service type corresponding to the stored QoE measurement report and/or a QoE measurement ID of the stored QoE measurement report; a request for reporting a size of a QoE measurement report corresponding to the service type corresponding to the stored QoE measurement report and/or a size of a QoE measurement report corresponding to the QoE measurement ID of the stored QoE measurement report; a request for reporting a configuration type corresponding to the stored QoE measurement report; and a request for reporting a size of a QoE measurement report corresponding to the configuration type corresponding to the stored QoE measurement report.

In an embodiment, the information associated with the QoE measurement report includes one or more of the following: the size of the stored QoE measurement report; the storage time of the QoE measurement report; the service type corresponding to the stored QoE measurement report and/or the QoE measurement ID of the stored QoE measurement report; a size of a QoE measurement report corresponding to the service type corresponding to the stored QoE measurement report and/or a size of a QoE measurement report corresponding to the QoE measurement ID of the stored QoE measurement report; the configuration type corresponding to the stored QoE measurement report; a size of a QoE measurement report corresponding to the configuration type corresponding to the stored QoE measurement report; and the first ID used to indicate whether the QoE measurement report has been reported.

In an embodiment, the first indication information is a second identifier indicating that the user terminal resumes reporting for the QoE measurement report.

In an embodiment, the first receiving device 500 is further used for: receiving second indication information transmitted from the network side device, where the second indication information is used to indicate the user terminal to report all QoE measurement reports: or, receiving third indication information transmitted from the network side device, where the third indication information is used to indicate the user terminal to report a QoE measurement report, where the third indication information includes one or more of the following: a timer for reporting the QoE measurement report after expiration; a limited size of the reported QoE measurement report; a service type corresponding to the reported QoE measurement report; a priority of the service type corresponding to the reported QoE measurement report; a QoE measurement ID of the reported QoE measurement report; a priority of the QoE measurement ID of the reported QoE measurement report; a configuration type corresponding to the reported QoE measurement report; and timing backoff time for reporting the QoE measurement report.

In an embodiment, the first indication information is time indication information used to indicate the user terminal to report the QoE measurement report.

In an embodiment, the time indication information is determined based on a terminal ID of the user terminal.

Figure 6:
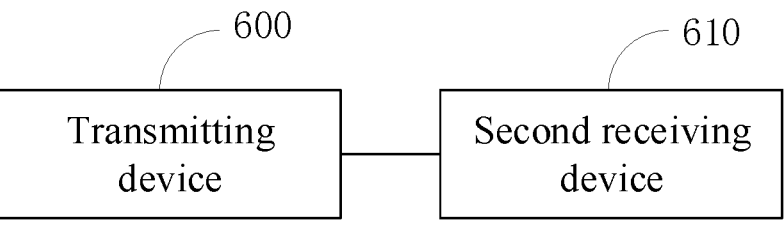
FIG. 6 is a second schematic structural diagram of an apparatus for reporting quality of experience (QoE) measurement reports according to an embodiment of the present application.

FIG. 6 is a schematic structural diagram of an apparatus for reporting quality of experience (QoE) measurement reports according to an embodiment of the present application. The apparatus is applied to a network side device. As shown in FIG. 6, the apparatus includes the following devices.

A transmitting device 600, is used for transmitting first indication information of one or more QoE measurement reports to a user terminal.

A second receiving device 610 is used for receiving a QoE measurement report and/or information associated with the QoE measurement report reported from the user terminal based on the first indication information.

In an embodiment, the receiving the QoE measurement report and/or the information associated with the QoE measurement report reported from the user terminal based on the first indication information includes:

receiving a QoE measurement report stored after reporting for the QoE measurement report is paused and/or information associated with the QoE measurement report stored after reporting for the QoE measurement report is paused reported from the user terminal.

In an embodiment, the apparatus is applied to a scenario where reporting for the QoE measurement report is resumed after being paused.

In an embodiment, the receiving the QoE measurement report and the information associated with the QoE measurement report reported from the user terminal based on the first indication information includes: receiving the QoE measurement report reported from the user terminal based on the first indication information, and further receiving information of a remaining QoE measurement report reported from the user terminal, where the information of the remaining QoE measurement report includes one or more of the following information: a size of the remaining QoE measurement report; storage time of the remaining QoE measurement report; a service type corresponding to the remaining QoE measurement report and/or a QoE measurement ID of the remaining QoE measurement report; a size of a QoE measurement report corresponding to the service type corresponding to the remaining QoE measurement report and/or a size of a QoE measurement report corresponding to the QoE measurement ID of the remaining QoE measurement report; a configuration type corresponding to the remaining QoE measurement report; a size of a QoE measurement report corresponding to the configuration type corresponding to the remaining QoE measurement report; and a first ID used to indicate whether the QoE measurement report has been reported.

In an embodiment, the transmitting the first indication information of one or more QoE measurement reports to the user terminal includes: transmitting, to the user terminal, the first indication information for requesting to obtain the information associated with the QoE measurement report, where the first indication information includes one or more of the following: a request for reporting a size of a stored QoE measurement report; a request for reporting storage time of the stored QoE measurement report; a request for reporting a service type corresponding to the stored QoE measurement report and/or a QoE measurement ID of the stored QoE measurement report; a request for reporting a size of a QoE measurement report corresponding to the service type corresponding to the stored QoE measurement report and/or a size of a QoE measurement report corresponding to the QoE measurement ID of the stored QoE measurement report; a request for reporting a configuration type corresponding to the stored QoE measurement report;

and a request for reporting a size of a QoE measurement report corresponding to the configuration type corresponding to the stored QoE measurement report.

In an embodiment, the transmitting device 600 is further used for: transmitting second indication information to the user terminal, where the second indication information is used to indicate the user terminal to report all QoE measurement reports: or, transmitting third indication information to the user terminal, where the third indication information is used to indicate the user terminal to report a QoE measurement report, where the third indication information includes one or more of the following: a timer for reporting the QoE measurement report after expiration; a limited size of the reported QoE measurement report; a service type corresponding to the reported QoE measurement report; a priority of the service type corresponding to the reported QoE measurement report; a QoE measurement ID of the reported QoE measurement report; a priority of the QoE measurement ID of the reported QoE measurement report; a configuration type corresponding to the reported QoE measurement report; and timing backoff time for reporting the QoE measurement report.

It should be noted that, the division of units in the embodiments of the present application is schematic, and is only a logical function division, and there may be other division manners in actual implementation. In addition, the functional units in the various embodiments of the present application may be integrated into one processing unit, or each unit may exist alone physically, or two or more units may be integrated into one unit. The above-mentioned integrated unit may be implemented in the form of hardware or software functional unit.

If the integrated unit is implemented in the form of a software functional unit and sold or used as an independent product, it may be stored in a computer readable storage medium. Based on such understanding, the embodiments of the present application in essence or a part of the embodiments that contributes to the prior art, or all or part of the embodiments, may be embodied in the form of a software product, which is stored in a storage medium, including several instructions to cause a computer device (which may be a personal computer, server, or network device, etc.) or a processor to perform all or part of the steps of the methods described in the respective embodiments of the present application. The storage medium described above includes various media that can store program codes such as U disk, mobile hard disk, read-only memory (ROM), random access memory (RAM), magnetic disk, or optical disk.

It should be noted here that the above-mentioned apparatus according to the embodiments of the present application can implement all the method steps implemented by the above-mentioned method embodiments, and can achieve the same effect. The same parts and beneficial effects as the same method embodiments will not be repeated here.

An embodiment of the present application further provides a processor-readable storage medium having stored thereon a computer program that cause a processor to perform the steps of the steps of the method for reporting QoE measurement reports, including: receiving a pause reporting message for the QoE measurement reports transmitted from a network side device, where the pause reporting message is used to indicate the user terminal to pause reporting for the QoE measurement reports based on first indication information transmitted from the network side device: and pausing reporting for the QoE measurement reports corresponding to the first indication information based on the pause reporting message.

An embodiment of the present application further provides a processor-readable storage medium having stored thereon a computer program that cause a processor to perform the steps of the steps of the method for reporting QoE measurement reports, including: transmitting a pause reporting message for the QoE measurement reports to a user terminal to indicate the user terminal to pause reporting for the QoE measurement reports based on first indication information transmitted from the network side device.

The computer readable storage medium can be any available medium or data storage device that can be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof can be implemented by computer-executable instructions. These computer-executable instructions may be provided to processors of a general purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor-executable instructions may also be stored in a processor-readable memory capable of directing a computer or other programmable data processing apparatus to operate in a particular manner, and the instructions stored in the processor-readable memory may result in a manufacture including instruction means, the instruction means can perform the functions specified in one or more flows of the flowchart and/or one or more blocks of the block diagram.

These processor-executable instructions can also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

The user terminal in the embodiments of the present application may be a device that provides voice and/or data connectivity to a user, a handhold device with a wireless connection function, or other processing device connected to a wireless modem. In different systems, the names of the user terminal may be different. For example, in the 5G system, the user terminal may be called as user equipment (UE). A radio terminal can communicate with one or more core networks (CN) via a radio access network (RAN), and the radio terminal can be a mobile terminal, such as a mobile phone (or "cellular" phone) and computers with mobile terminal, e.g., a portable mobile device, a pocket-sized mobile device, a hand-held mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A radio terminal may also be called a system, a subscriber unit, a subscriber station, a mobile station, a mobile, a remote station, an access point, a remote terminal, an access terminal, a user terminal, a user agent, and a user device, which are not limited in the embodiments of the present application.

The network side device involved in the embodiments of the present application may be a base station, and the base station may include cells providing services for the terminal. Depending on the specific application, the network side device may also be called an access point, or may be a device in the access network that communicates with wireless terminal through one or more sectors on the air interface, or other names. The network side device can be used to exchange received air frames with Internet Protocol (IP) packets, and act as a router between radio terminal and the rest of the access network, and the rest of the access network can include an Internet protocol (IP) communication network. The network side device may also coordinate attribute management for the air interface. For example, the network side device in the embodiments of the present application may be a base transceiver station (BTS) in a global system for mobile communications (GSM) or a code division multiple access (CDMA), may also be a node B in a wide-band code division multiple access (WCDMA), may also be an evolutional node B (eNB or e-Node B) in a long term evolution (LTE) system, a 5G base station (gNB) in 5G network architecture (next generation system), may also be a Home evolved Node B (HeNB), a relay node (relay node), a femto, a pico base station (pico), etc., which are not limited in the embodiments of the present application. In some network structures, a network side device may include a centralized unit (CU) node and a distributed unit (DU) node, and the centralized unit and the distributed unit may also be geographically separated.

What is claimed is:

1. A method for reporting quality of experience (QoE) measurement reports, applied to a user terminal, comprising:

receiving first indication information of one or more QoE measurement reports transmitted from a network side device; and reporting a QoE measurement report and information associated with the QoE measurement report to the network side device based on the first indication information;

wherein the reporting the QoE measurement report and the information associated with the QoE measurement report to the network side device based on the first indication information comprises:

reporting the QoE measurement report to the network side device based on the first indication information, and further reporting information of a remaining QoE measurement report to the network side device, wherein the information of the remaining QoE measurement report comprises one or more of the following information:

a size of the remaining QoE measurement report;

storage time of the remaining QoE measurement report;

a service type corresponding to the remaining QoE measurement report and/or a QoE measurement ID of the remaining QoE measurement report;

a size of a QoE measurement report corresponding to the service type corresponding to the remaining QoE measurement report and/or a size of a QoE measurement report corresponding to the QoE measurement ID of the remaining QoE measurement report;

a configuration type corresponding to the remaining QoE measurement report;

a size of a QoE measurement report corresponding to the configuration type corresponding to the remaining QoE measurement report; and a first ID used to indicate whether the QoE measurement report has been reported.

2. The method of claim 1, wherein the first indication information is used to indicate reporting for the QoE measurement report, and the first indication information comprises one or more of the following:

a timer for reporting the QoE measurement report after expiration;

a limited size of a reported QoE measurement report;

a service type corresponding to a reported QoE measurement report;

a priority of the service type corresponding to a reported QoE measurement report;

a QoE measurement identifier (ID) of a reported QoE measurement report;

a priority of the QoE measurement ID of a reported QoE measurement report;

a configuration type corresponding to a reported QoE measurement report; and timing backoff time for reporting the QoE measurement report.

3. The method of claim 1, wherein the first indication information is used to request to obtain the information associated with the QoE measurement report, and the first indication information comprises one or more of the following:

a request for reporting a size of a stored QoE measurement report;

a request for reporting storage time of a stored QoE measurement report;

a request for reporting a service type corresponding to a stored QoE measurement report and/or a QoE measurement identifier (ID) of a stored QoE measurement report;

a request for reporting a size of a QoE measurement report corresponding to the service type corresponding to the stored QoE measurement report and/or a size of a QoE measurement report corresponding to the QoE measurement ID of the stored QoE measurement report;

a request for reporting a configuration type corresponding to a stored QoE measurement report; and a request for reporting a size of a QoE measurement report corresponding to the configuration type corresponding to the stored QoE measurement report.

4. The method of claim 1, wherein the information associated with the QoE measurement report comprises one or more of the following:

a size of a stored QoE measurement report;

storage time of a stored QoE measurement report;

a service type corresponding to a stored QoE measurement report and/or a QoE measurement identifier (ID) of a stored QoE measurement report;

a size of a QoE measurement report corresponding to the service type corresponding to the stored QoE measurement report and/or a size of a QoE measurement report corresponding to the QoE measurement ID of the stored QoE measurement report;

a configuration type corresponding to a stored QoE measurement report;

a size of a QoE measurement report corresponding to the configuration type corresponding to the stored QoE measurement report; and a first ID used to indicate whether the QoE measurement report has been reported.

5. The method of claim 1, further comprising:

receiving second indication information transmitted from the network side device, wherein the second indication information is used to indicate the user terminal to report all QoE measurement reports;

or, receiving third indication information transmitted from the network side device, wherein the third indication information is used to indicate the user terminal to report a QoE measurement report, wherein the third indication information comprises one or more of the following:

a timer for reporting the QoE measurement report after expiration;

a limited size of a reported QoE measurement report;

a service type corresponding to a reported QoE measurement report;

a priority of the service type corresponding to the reported QoE measurement report;

a QoE measurement ID of a reported QoE measurement report;

a priority of the QoE measurement ID of the reported QoE measurement report;

a configuration type corresponding to a reported QoE measurement report; and timing backoff time for reporting the QoE measurement report.

6. A method for reporting quality of experience (QoE) measurement reports, applied to a network side device, comprising:

transmitting first indication information of one or more QoE measurement reports to a user terminal; and receiving a QoE measurement report and information associated with the QoE measurement report reported from the user terminal based on the first indication information;

wherein the receiving the QoE measurement report and the information associated with the QoE measurement report reported from the user terminal based on the first indication information comprises:

receiving the QoE measurement report reported from the user terminal based on the first indication information, and further receiving information of a remaining QoE measurement report reported from the user terminal, wherein the information of the remaining QoE measurement report comprises one or more of the following information:

a size of the remaining QoE measurement report;

storage time of the remaining QoE measurement report;

a service type corresponding to the remaining QoE measurement report and/or a QoE measurement identifier (ID) of the remaining QoE measurement report;

a size of a QoE measurement report corresponding to the service type corresponding to the remaining QoE measurement report and/or a size of a QoE measurement report corresponding to the QoE measurement ID of the remaining QoE measurement report;

a configuration type corresponding to the remaining QoE measurement report;

a size of a QoE measurement report corresponding to the configuration type corresponding to the remaining QoE measurement report; and a first ID used to indicate whether the QoE measurement report has been reported.

7. The method of claim 6, wherein the transmitting the first indication information of one or more QoE measurement reports to the user terminal comprises:

transmitting, to the user terminal, the first indication information for requesting to obtain the information associated with the QoE measurement report, wherein the first indication information comprises one or more of the following:

a request for reporting a size of a stored QoE measurement report;

a request for reporting storage time of a stored QoE measurement report;

a request for reporting a service type corresponding to a stored QoE measurement report and/or a QoE measurement identifier (ID) of a stored QoE measurement report;

a request for reporting a size of a QoE measurement report corresponding to the service type corresponding to the stored QoE measurement report and/or a size of a QoE measurement report corresponding to the QoE measurement ID of the stored QoE measurement report;

a request for reporting a configuration type corresponding to a stored QoE measurement report; and a request for reporting a size of a QE measurement report corresponding to the configuration type corresponding to the stored QoE measurement report.

8. The method of claim 6, further comprising:

transmitting second indication information to the user terminal, wherein the second indication information is used to indicate the user terminal to report all QoE measurement reports;

or, transmitting third indication information to the user terminal, wherein the third indication information is used to indicate the user terminal to report a QoE measurement report, wherein the third indication information comprises one or more of the following:

a timer for reporting the QoE measurement report after expiration;

a limited size of a reported QoE measurement report;

a service type corresponding to a reported QoE measurement report;

a priority of the service type corresponding to the reported QoE measurement report;

a QoE measurement ID of a reported QoE measurement report;

a priority of the QoE measurement ID of the reported QoE measurement report;

a configuration type corresponding to a reported QoE measurement report; and timing backoff time for reporting the QoE measurement report.

9. A user terminal, comprising:

a memory;

a transceiver; and a processor, wherein the memory is used to store a computer program;

the transceiver is used to transmit and receive data under a control of the processor; and the processor is used to read the computer program in the memory and causes the terminal to execute the following operations of:

receiving first indication information of one or more quality of experience (QoE) measurement reports transmitted from a network side device; and reporting a QoE measurement report and information associated with the QoE measurement report to the network side device based on the first indication information;

wherein the reporting the QoE measurement report and the information associated with the QoE measurement report to the network side device based on the first indication information comprises:

reporting the QoE measurement report to the network side device based on the first indication information, and further reporting information of a remaining QoE measurement report to the network side device, wherein the information of the remaining QoE measurement report comprises one or more of the following information:

a size of the remaining QoE measurement report;

storage time of the remaining QoE measurement report;

a service type corresponding to the remaining QoE measurement report and/or a QoE measurement ID of the remaining QoE measurement report;

a size of a QoE measurement report corresponding to the service type corresponding to the remaining QoE measurement report and/or a size of a QoE measurement report corresponding to the QoE measurement ID of the remaining QoE measurement report;

a configuration type corresponding to the remaining QoE measurement report;

a size of a QoE measurement report corresponding to the configuration type corresponding to the remaining QoE measurement report; and a first ID used to indicate whether the QoE measurement report has been reported.

10. The user terminal of claim 9, wherein the first indication information is used to indicate reporting for the QoE measurement report, and the first indication information comprises one or more of the following:

a timer for reporting the QoE measurement report after expiration;

a limited size of a reported QoE measurement report;

a service type corresponding to a reported QoE measurement report;

a priority of the service type corresponding to a reported QoE measurement report;

a QoE measurement identifier (ID) of a reported QoE measurement report;

a priority of the QoE measurement ID of a reported QoE measurement report;

a configuration type corresponding to a reported QoE measurement report; and timing backoff time for reporting the QoE measurement report.

11. The user terminal of claim 9, wherein the first indication information is used to request to obtain the information associated with the QoE measurement report, and the first indication information comprises one or more of the following:

a request for reporting a size of a stored QoE measurement report;

a request for reporting storage time of a stored QoE measurement report;

a request for reporting a service type corresponding to a stored QoE measurement report and/or a QoE measurement identifier (ID) of a stored QoE measurement report;

a request for reporting a size of a QoE measurement report corresponding to the service type corresponding to the stored QoE measurement report and/or a size of a QoE measurement report corresponding to the QoE measurement ID of the stored QoE measurement report;

a request for reporting a configuration type corresponding to a stored QoE measurement report; and a request for reporting a size of a QoE measurement report corresponding to the configuration type corresponding to the stored QoE measurement report.

12. The user terminal of claim 9, wherein the information associated with the QoE measurement report comprises one or more of the following:

a size of a stored QoE measurement report;

storage time of a stored QoE measurement report;

a service type corresponding to a stored QoE measurement report and/or the QoE measurement identifier (ID) of a stored QoE measurement report;

a size of a QoE measurement report corresponding to the service type corresponding to the stored QoE measurement report and/or a size of a QoE measurement report corresponding to the QoE measurement ID of the stored QoE measurement report;

a configuration type corresponding to a stored QoE measurement report;

a size of a QoE measurement report corresponding to the configuration type corresponding to the stored QoE measurement report; and the first ID used to indicate whether the QoE measurement report has been reported.

13. The user terminal of claim 9, wherein the operation further comprises:

receiving second indication information transmitted from the network side device, wherein the second indication information is used to indicate the user terminal to report all QoE measurement reports;

or, receiving third indication information transmitted from the network side device, wherein the third indication information is used to indicate the user terminal to report a QoE measurement report, wherein the third indication information comprises one or more of the following:

a timer for reporting the QoE measurement report after expiration;

a limited size of a reported QoE measurement report;

a service type corresponding to a reported QoE measurement report;

a priority of the service type corresponding to the reported QoE measurement report;

a QoE measurement ID of a reported QoE measurement report;

a priority of the QoE measurement ID of the reported QoE measurement report;

a configuration type corresponding to a reported QoE measurement report; and timing backoff time for reporting the QoE measurement report.

14. A network side device, comprising:

a memory;

a transceiver; and a processor, wherein the memory is used to store a computer program;

the transceiver is used to transmit and receive data under a control of the processor; and the processor is used to read the computer program in the memory and causes the terminal to execute the operations of claim 6;

wherein the receiving the QoE measurement report and the information associated with the QoE measurement report reported from the user terminal based on the first indication information comprises:

receiving the QoE measurement report reported from the user terminal based on the first indication information, and further receiving information of a remaining QoE measurement report reported from the user terminal, wherein the information of the remaining QoE measurement report comprises one or more of the following information:

a size of the remaining QoE measurement report;

storage time of the remaining QoE measurement report;

a service type corresponding to the remaining QoE measurement report and/or a QoE measurement identifier (ID) of the remaining QoE measurement report;

a size of a QoE measurement report corresponding to the service type corresponding to the remaining QoE measurement report and/or a size of a QoE measurement report corresponding to the QoE measurement ID of the remaining QoE measurement report;

a configuration type corresponding to the remaining QoE measurement report;

a size of a QoE measurement report corresponding to the configuration type corresponding to the remaining QoE measurement report; and a first ID used to indicate whether the QoE measurement report has been reported.

15. The network side device of claim 14, wherein the transmitting the first indication information of one or more QoE measurement reports to the user terminal comprises:

transmitting, to the user terminal, the first indication information for requesting to obtain the information associated with the QoE measurement report, wherein the first indication information comprises one or more of the following:

a request for reporting a size of a stored QoE measurement report;

a request for reporting storage time of a stored QoE measurement report;

a request for reporting a service type corresponding to a stored QoE measurement report and/or a QoE measurement identifier (ID) of a stored QoE measurement report;

a request for reporting a size of a QoE measurement report corresponding to the service type corresponding to the stored QoE measurement report and/or a size of a QoE measurement report corresponding to the QoE measurement ID of the stored QoE measurement report;

a request for reporting a configuration type corresponding to a stored QoE measurement report; and a request for reporting a size of a QoE measurement report corresponding to the configuration type corresponding to the stored QoE measurement report.

16. The network side device of claim 14, the operations further comprise:

transmitting second indication information to the user terminal, wherein the second indication information is used to indicate the user terminal to report all QoE measurement reports;

or, transmitting third indication information to the user terminal, wherein the third indication information is used to indicate the user terminal to report a QoE measurement report, wherein the third indication information comprises one or more of the following:

a timer for reporting the QoE measurement report after expiration;

a limited size of a reported QoE measurement report;

a service type corresponding to a reported QoE measurement report;

a priority of the service type corresponding to the reported QoE measurement report;

a QoE measurement ID of a reported QoE measurement report;

a priority of the QoE measurement ID of the reported QoE measurement report;

a configuration type corresponding to a reported QoE measurement report; and timing backoff time for reporting the QoE measurement report.

\* \* \* \* \*